(12) United States Patent
Graham

(10) Patent No.: US 8,517,177 B2
(45) Date of Patent: Aug. 27, 2013

(54) SYSTEMS AND METHODS FOR RECOVERING MATERIALS FROM SOIL

(76) Inventor: Barry D. Graham, Vista, CA (US)

( * ) Notice: Subject to any disclaimer, the term of this patent is extended or adjusted under 35 U.S.C. 154(b) by 388 days.

(21) Appl. No.: 12/851,503

(22) Filed: Aug. 5, 2010

(65) Prior Publication Data

US 2011/0031166 A1 Feb. 10, 2011

Related U.S. Application Data

(60) Provisional application No. 61/231,610, filed on Aug. 5, 2009.

(51) Int. Cl.
*B03B 7/00* (2006.01)
(52) U.S. Cl.
USPC ............... 209/12.1; 209/13; 209/19; 209/571
(58) Field of Classification Search
USPC ..................... 209/12.1, 13, 19, 634
See application file for complete search history.

(56) References Cited

U.S. PATENT DOCUMENTS

| | | | | |
|---|---|---|---|---|
| 4,077,847 A * | 3/1978 | Choi et al. | | 201/21 |
| 4,387,019 A * | 6/1983 | Dale et al. | | 44/605 |
| 5,443,157 A * | 8/1995 | Baker et al. | | 209/12.1 |
| 6,938,776 B2 * | 9/2005 | Rem et al. | | 209/13 |
| 6,953,517 B1 * | 10/2005 | Boretzky et al. | | 201/3 |
| 8,138,437 B2 * | 3/2012 | Valerio | | 209/571 |
| 2007/0187299 A1 * | 8/2007 | Valerio | | 209/12.1 |
| 2008/0290001 A1 * | 11/2008 | Lindner | | 209/19 |
| 2010/0126913 A1 * | 5/2010 | Valerio | | 209/19 |
| 2011/0031166 A1 * | 2/2011 | Graham | | 209/19 |

* cited by examiner

*Primary Examiner* — Terrell Matthews
(74) *Attorney, Agent, or Firm* — Knobbe, Martens, Olson & Bear, LLP

(57) ABSTRACT

Systems and methods for recovering materials from soil are disclosed. In one embodiment, a system for recovering materials from soil comprises a size separation system, a first magnetic separator, a second magnetic separator, an air classifier/scrubber system, and a non-ferrous metal separator. The system for recovering materials from soil can be configured to separate soil from other recoverable materials, including, for example, rock and gravel aggregates, and/or metals.

16 Claims, 15 Drawing Sheets

SYSTEMS AND METHODS FOR RECOVERING MATERIALS FROM SOIL

CROSS-REFERENCE TO RELATED APPLICATIONS

This application claims the benefit of U.S. Provisional Application No. 61/231,610 filed on Aug. 5, 2009, entitled "SOIL REMEDIATION SYSTEM," which is hereby incorporated by reference in its entirety.

BACKGROUND

1. Field

The invention relates generally to systems and methods for recovering materials from soil and particularly to systems and methods for recovering metals from soil.

2. Description of the Related Art

Solid wastes are generated by many aspects of modern society. Solid wastes from industrial processes, construction/demolition projects and many other human endeavors often contain significant quantities of recoverable materials including soil, rock and gravel aggregates, and metals. Recoverable metals frequently take the form of discrete wastes, waste mixtures, or by-products of the primary process. As such, these materials are sometimes handled, stored, and/or disposed of in a manner that causes them to become mixed with soil or mixed with other solid wastes and particulate debris. Metal bearing soil/particulate debris may be found in stockpiles and in-situ at a wide range of industrial facilities including scrap recycling yards, mills, foundries, landfills, weapons ranges and many abandoned sites previously occupied by similar industries. In some cases, such as landfills and weapons firing ranges, the metal-soil mixture is the result of intentional practices. In most cases, the entire volume of metal bearing soil/debris is rendered unusable for even the most rudimentary reuse, e.g., solid fill disposal, because of its chemical and physical characteristics.

Many jurisdictions enforce environmental regulations that define metal bearing soil/debris as hazardous waste when metal concentrations are elevated. Once the metal bearing soil is classified as hazardous and a "cleanup" is ordered, significant and prohibitive cost and management consequences up to and including comprehensive site remediation are triggered for the waste generator or property owner. The "cleanup" or site remediation practice most commonly employed for metal bearing soil/debris involves a complete excavation of the affected soil volume followed by offsite disposition at an approved facility that is usually remotely located. The financial and logistical impacts of excavation and disposal can be overwhelming for the party responsible for the cleanup and mandatory clean-up orders have led some businesses to financial ruin. In addition to cost, remediation by excavation and disposal incurs its own set of environmental impacts related to increased risk to human health and the environment, and risks associated with transportation such as fuel consumption and the potential release of hazardous materials. Remediation by excavation or disposal ultimately transfers the entire waste volume, including recoverable materials, from one location to another at significant expense and with increased risk to the environment. Another adverse environmental impact associated with remediation by excavation and landfill disposal is the unnecessary consumption of a finite resource; disposal site volume. Disposition of recoverable materials along with the soils not only wastes landfill capacity, it eliminates any opportunity to recover the intrinsic and monetary value of materials that can be reused.

In summary, there is a need for a system and/or processes to treat metal bearing soil/particulate debris to recover the composite portions of recoverable materials from the mixture. Typical portions that can be recovered and separated will include soil, aggregates, metals (ferromagnetic and non-ferrous), and debris. Systems to recover materials from soil will produce economic and environmental benefits by producing a potentially reusable soil component, allowing for recovery of the value of recyclable components, and reducing the volume of affected wastes should landfill disposal of these waste residuals be necessary.

SUMMARY

The system, method, and devices disclosed herein each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments," one will understand how the features of the embodiments described herein provide advantages over other the prior art.

In one embodiment a system for recovering materials from soil includes a first separator comprising a first separation element, the first separator configured to separate recoverable material bearing soil into a first portion comprising large recoverable materials that did not pass through the first separation element and a second portion of recoverable material bearing soil that did pass through the first separation element, the second portion comprising soil and recoverable materials smaller than the large recoverable materials, a first conveyance positioned to receive the second portion from the first separator, wherein first conveyance is configured to move the second portion of recoverable material bearing soil to another separator, a second separator having a second separation element having apertures, the second separator configured to receive the second portion of recoverable material bearing soil from the first conveyance and, using the screen structure, separate the second portion of recoverable material bearing soil into a third portion comprising mid-size recoverable materials and a fourth portion that passes through the screen structure comprising soil and recoverable materials, a second conveyance configured to receive and move the fourth portion and a third conveyance configured to receive and move the third portion, a third separator comprising a magnetic device, the third separator configured to receive the fourth portion and separate the fourth portion into a first group and a second group using a magnetic field created by the magnetic device, wherein the first group contains ferrous material that was influenced by the magnetic field, a fourth separator comprising a magnetic separation system, the fourth separator configured to receive and process the third portion using the magnetic separation system to separate the third portion into at least two groups, a mid-size non-ferrous group and a mid-size ferrous metal group, the mid-size ferrous group containing more ferrous recoverable materials than the mid-size non-ferrous group, a fifth separator comprising an air classifier/scrubber system having air flow components and at least one material scrubber component, the fifth separator configured to receive the mid-size non-ferrous group and expose the mid-size non-ferrous group to an air flow and the scrubber the at least one scrubber component and separate the mid-size non-ferrous group into a lighter weight mid-size first group and a heavier mid-size second group, and a sixth separator configured to receive the mid-size second group and separate non-ferrous metal material from the mid-size second group.

The first separation element can have bars spaced at a certain distance to form spaces (or apertures) between the bars, or holes (or apertures) of a suitable shape and size to perform the desired separation. Embodiments described herein can also include an air pollution control system, the air pollution control system comprising, a plurality of intake hoods positioned to intake airborne particulate matter generated by the first, second, third, fourth, and fifth separator, ducting connected to each of the plurality of hoods, and at least one filter configured to filter particulate matter from passing air. The air classifier/scrubber system can include a scrubber surface having a plurality of protrusions, the scrubber surface disposed such that at least a portion of the mid-size non-ferrous group contacts the scrubber surface while being exposed to an air flow of the air classifier/scrubber system. In some embodiments, the first conveyance includes a conveyer belt system. In some embodiments, the first separation element includes a grizzly screen. In some embodiments, the second separation element includes a rotating drum screen. In some embodiments, the sixth separator is further configured to separate ferrous metal recoverable materials from the group of recoverable materials not susceptible to air flow classification. In some embodiments, the third separator includes a feed hopper positioned to receive the fourth portion from the third conveyance, an adjustable gate configured to regulate the amount of material flowing therethrough, and a variable speed conveyance configured to move the fourth portion from the feed hopper through the adjustable gate where the variable speed conveyance is configured to carry the fourth portion through the magnetic field created by the magnetic device, the magnetic device disposed such that the magnetic field created by the magnetic device holds ferrous material in the fourth portion to the variable speed conveyance, allowing the mid-size non-ferrous group to fall from the variable speed conveyance at a different point than the mid-size ferrous metal group falls from the variable speed conveyance. In some embodiments the fourth separator comprises a drum magnet.

In some embodiments, the sixth separator comprises an eddy current generator, and wherein the sixth separator is configured to move the mid-size second group through an electric field created by the eddy current generator causing non-ferrous metal material in the mid-size second group to move and separate from other material in the mid-size second group. Some embodiments further include a containment housing that contains the first size separator, the second size separator, the first conveyance, the second conveyance, the third conveyance, the third separator, the fourth separator, the fifth separator, and at least a portion of the air pollution control system. In some embodiments, the first separation element comprises a plurality of parallel members disposed between about 1" and about 36" from one another. In some embodiments, wherein the apertures of the second separation element have an area between 0.10 square inches and 5 square inches. In some embodiments the air classifier/scrubber system is configured to create an air flow with a velocity between about 400 feet per minute and about 1200 feet per minute.

In some embodiments a soil mixture separation system includes a first means for separating a soil mixture into a first portion of large recoverable materials of a first predetermined size and a second portion of materials that are smaller than the first predetermined size, a second means for separating configured to receive the second portion of materials and separate the second portion into a third portion having of materials having a second predetermined size that is smaller than the first predetermined size, and a fourth portion of materials that are smaller than the second predetermined size, a third means for separating comprising a magnetic device, the third separating means configured to receive the fourth portion and separate the fourth portion into a first group and a second group using a magnetic field created by the magnetic device, wherein the first group contains ferrous material that was influenced by the magnetic field during separation, a fourth means for separating comprising a magnetic separation system, the fourth separating means configured to receive the third portion of materials and separate the third portion into at least two groups of materials, a non-ferrous group and a ferrous metal group, the ferrous group containing more recoverable materials containing iron than the non-ferrous group, a fifth means for separating having an air classifier/scrubber system comprising means for generating an air flow and means for mechanically agitating material as it is subject to the air flow, the fifth separator configured to receive the non-ferrous group of materials from the fourth separation means and separate the non-ferrous group into a lighter weight first group of materials and a heavier second group of materials using the air flow generation means and the agitating means, and a sixth means for separating having means for generating eddy currents in metal materials, the sixth separating means configured to receive the second group of materials from the fifth separating means and separate non-ferrous metal material from the second group of materials using the eddy current generation means. Such embodiments can also include means for moving the soil mixture and the separated materials from one of the separating means to another of the separating means. The first separating means can include a first separator comprising a first separation element having apertures, and the second separating means comprises a second separator having a second separation element having apertures. the third separation means comprises a third separator comprising a magnetic device.

Another embodiment includes a method of recovering materials from soil that can include separating a soil mixture into a first portion of large recoverable materials of a first predetermined size and a second portion of materials that are smaller than the first predetermined size, separating the second portion into a third portion having of materials having a second predetermined size that is smaller than the first predetermined size, and a fourth portion of materials that are smaller than the second predetermined size, separating the fourth portion into a first group and a second group using a magnetic field created by the magnetic device, wherein the first group contains ferrous material that was influenced by the magnetic field during separation, separating the third portion into at least two groups of materials, a non-ferrous group of materials and a ferrous metal group of materials, the ferrous group of materials containing more recoverable materials containing iron than the non-ferrous group of materials, separating non-ferrous group of materials into a lighter weight first group of materials and a heavier second group of materials by exposing the non-ferrous group of materials to a separation air flow while mechanically agitating the non-ferrous group of materials, and separating non-ferrous metal materials from the heavier second group of materials by passing the heavier second group of materials near a system that induces eddy currents in non-ferrous metal materials that are in the heavier second group of materials, the eddy currents being strong enough to physically move the non-ferrous metal materials away from a conveyance that they rest upon and into a non-ferrous metal material area. In such methods, the separating non-ferrous group of materials into a lighter weight first group of materials and a heavier second group of materials can be performed using an air classifier/scrubber system having a scrubbing structure that agitates material falling across its surface while exposing the agitated material to a separation air flow. Also, methods can include collecting airborne particulates at each of the separating steps.

BRIEF DESCRIPTION OF THE DRAWINGS

The above-mentioned and other features and advantages of the invention will become more fully apparent from the following detailed description, the appended claims, and in connection with the accompanying drawings in which:

DETAILED DESCRIPTION OF CERTAIN EMBODIMENTS

Embodiments of the invention will now be described with reference to FIGS. 1-16, wherein like numerals refer to like elements throughout. The terminology used in the description presented herein is not intended to be interpreted in any limited or restrictive manner, simply because it is being utilized in conjunction with a detailed description of certain embodiments of the invention. Furthermore, embodiments of the invention may include several novel features, no single one of which is solely responsible for its desirable attributes or which is essential to practicing the inventions herein described. The scope of the invention should therefore be construed in accordance with the appended claims and any equivalents thereof. To help illustrate embodiments of the invention that are illustrated in more than one figure, certain figures include reference letters to indicate how components schematically illustrated in one figure may be tied to other components schematically illustrated in one or more other figures.

Figure 1:
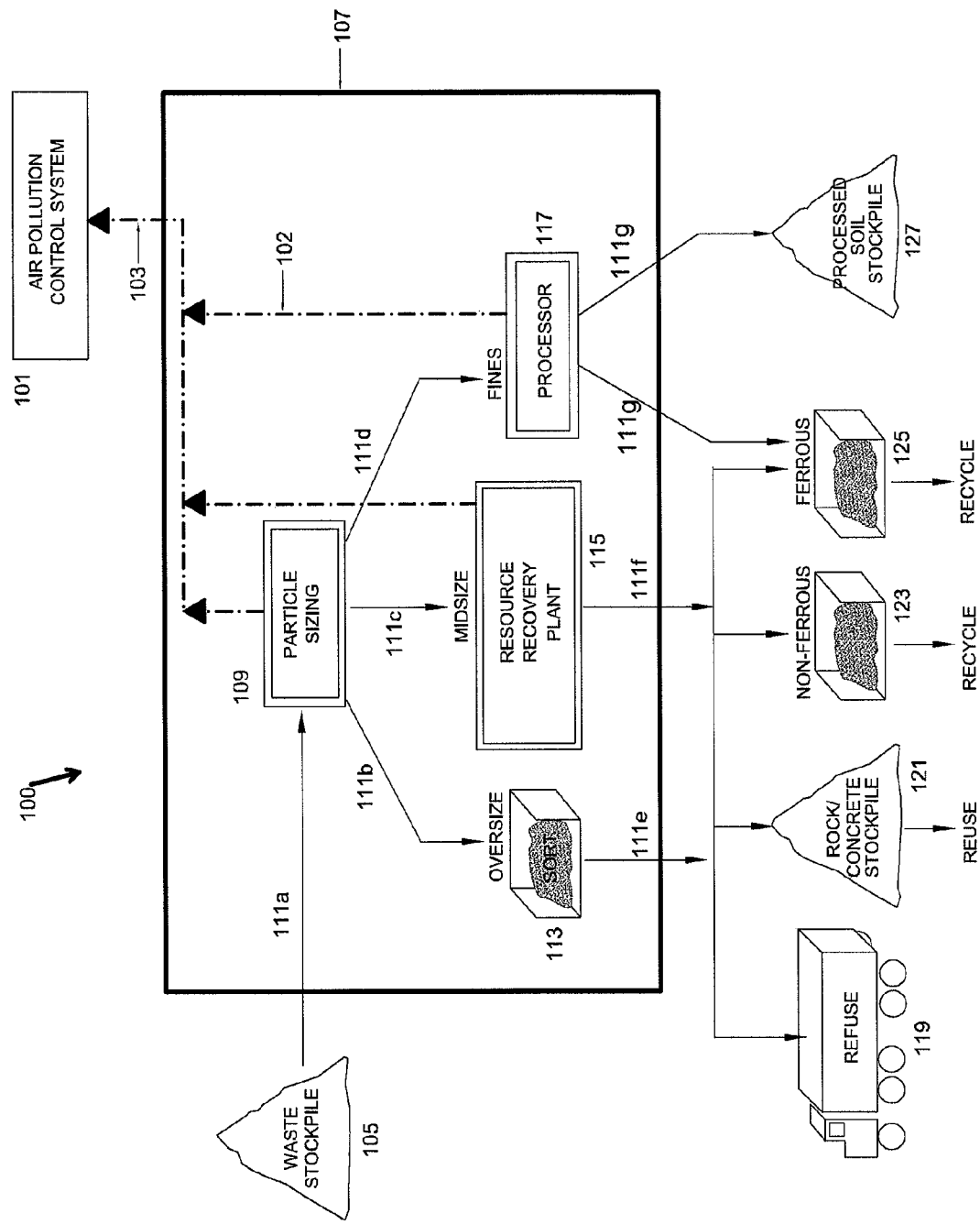
FIG. 1 is a block diagram of a system for recovering materials from a soil mixture.

FIG. 1 is a high level diagram showing an embodiment of a system 100 for recovering materials from soil or other particulate source materials. The system 100 described herein has numerous applications, including remediating contaminated soil, and/or recouping valuable and/or reusable recoverable materials (e.g., metals, soil, and rock and gravel aggregates) from a source material. One example of these applications would be processing the soil of a property that has been designated as requiring remediation to meet environmental regulatory standards. Incidental to the remediation, the extraction of recoverable materials that were mixed with the soil allows for their reuse, recycling, or simplified disposal. Once recovered, the processed soil can be evaluated for possible reuse.

Another reason for remediation would be to achieve geotechnical standards. Geotechnical properties such as compaction and porosity may be brought to within acceptable limits for soils that contain large amounts of debris or trash by removal of these recoverable materials from the soil using the system described herein. Providing that hazardous constituent levels do not exceed regulatory limits in the remaining processed soil, this soil may then be conceivably reused for fill and/or construction base. In some instances, recoverable materials within the soil may be of sufficient market value to justify their recovery absent any remediation requirement.

FIG. 1 illustrates the system 100 receiving soil mixed with recoverable materials ("soil mixture" 105). As used herein, the phrase "soil mixture" is a broad term that refers to a soil that is mixed with other recoverable materials (e.g., recoverable metals and/or hazardous waste). During processing to remove recoverable materials from the soil mixture, an amount of soil (or a batch) is processed through the recovery system. The soil mixture can be fed into the system continuously or in certain quantities. In certain implementations the soil mixture 105 can be a waste stockpile that exists at a site, or transported to the system for processing. Similarly, the system 100 may be located on-site at a location comprising soil mixture or the system 100 may be located off-site. The recoverable materials in the soil mixture can include rocks, concrete, auto parts, scrap metal, trash, fabrics, foams, rubbers, plastics, polymers, and/or glass and similar materials.

As illustrated schematically in the embodiment shown in FIG. 1, the soil mixture 105 is transported by conveyance 111a to a particle size separation system 109. The conveyance 111a (and the other conveyances discussed herein) can include structures, devices, and systems that are configured to move the soil mixture (and portions thereof) from one location of the system 105 to other locations of the system 105 for further processing, or final collection. For example, conveyance 111a can include a pick-up truck and a shovel. In another embodiment, conveyance 111a may include a front-loader attached to a tractor, a conveyor belt, a crane, and a feed hopper. The size separation system 109 separates the soil mixture 105 into groups according to size. For example, the size separation system 109 can separate the batch of soil mixture 105 into three groups. In one embodiment, the size separation 109 includes one or more separation elements (for example, bars, grates or screens, and more particularly a grizzly screen or a rotating drum screen). In another embodiment, a size separation system 109 can include a fluid separation mechanism, for example, an air classifier system or a fluid tank. In other embodiments, the size separation system 109 can include a mass separator configured to use known densities and volumes of the soil and recoverable materials to separate the batch of soil mixture 105 into groups by mass.

Still referring to FIG. 1, one of the groups of materials that are separated by the size separation system 109 is an oversize (or large) group that includes recoverable materials of a size that is equal to or greater than a first certain size. For example, the recoverable materials in an oversize group can include car doors, refrigerators, refrigerator doors, industrial hardware, engine blocks, barrels, large drums, large pieces of scrap metal, appliances, large pieces of vegetation including tree branches and trunks, tires, cinder blocks, tools, machinery, and elongated objects including poles, pipes, wiring, ducts, or culverts. Another group of materials that is separated by the size separation system 109 is a mid-size group that can include soil and recoverable materials that are smaller than the first certain size (for large materials) and of a size equal to or greater than a second certain size. The mid-size group of materials can include, for example, rocks, pieces of concrete, bricks, bones, cans, bottles, car parts, appliance parts, cutlery, bottle caps, and coins, depending on exactly the predetermined size threshold of the mid-size materials. Another group of materials that is separated by the size separation system 109 is a fine-sized ("fines") group that includes soil and recoverable materials whose size is smaller that the second certain size. For example, small pieces of scrap metal, crushed glass, soil, sand, and gravel can be in the fines group, depending on the particular threshold size limit defined for this group.

Still referring to FIG. 1, after the size separation system 109 separates the input soil mixture 105 into groups according to size, the groups can be moved for further processing, for example by conveyances 111b-d. The size separation system 109 is shown to include an oversize material sorter 113 ("oversize sorter 113"), a mid-size material recovery plant 115, and a fine-sized material processor 117. In one embodiment an oversize group is transported from the size separation system 109 by conveyance 111b to the oversize sorter 113 for further processing; a mid-size group is transported from the size separation system 109 by conveyance 111c to the mid-size resource recovery plant 115 for further processing; and a fines group is transported from the size separation system 109 to the fines processor 117 by conveyance 111d. Conveyances 111a-d can include any conveyance systems or devices (or two or more conveyances) that are configured to transport recoverable materials and/or soil from one location to another. For example, in some embodiments conveyance 111b includes a conveyor belt system, or conveyance 111a can include a conveyor belt and a chain drag, a chute, and/or a slide to direct material to certain locations.

Still referring to FIG. 1, after oversize, mid-size, and fines groups of materials are formed from portions of the soil mixture by the size separation system 109, these groups (or portions) can be further separated into more groups of recoverable materials by an oversize sorter 113, a mid-size resource recovery plant 115, and a fines processor 117, respectively. For example, in the illustrated embodiment the materials are separated into five groups: refuse 119, rock/concrete 121, non-ferrous materials 123, ferrous materials 125, and processed soil 127. The oversize sorter 113 can include a chute to direct the oversize material to certain locations, and a magnetic device capable of generating a relatively strong magnetic field that is capable of influencing ferrous oversize material. For example, the oversize sorter 113 can include one or more chutes configured to separate and divert ferrous metal recoverable materials from non-ferrous recoverable materials, and comprise a drum magnet. In some embodiments, the oversize sorter 113 includes a sorting area where oversize objects may be separated into additional groups, either manually or by automated or semi-automated equipment.

The mid-size resource recovery plant 115 can include one or more systems or devices having one or more magnets. The mid-size resource recovery plant 115 can utilize a specific sequence of processes to separate materials based on the basis of their physical/mechanical characteristics (e.g., density, conductivity, and/or magnetic properties), according to some embodiments. In certain embodiments, the mid-size resource recovery plant 115 can include one or more sorting areas for manually, automatically, or semi-automatically sorting mid-sized materials, and/or can also include fluid separation systems. The fines processor 117 is configured to separate materials of the fines group into two or more groups. In some embodiments the fines processor 117 includes at least one magnetic field generating device or system. In other embodiments, the fines processor 117 includes a drum magnet configured to separate ferrous metal recoverable materials from a group of fines. In other embodiments, the fines processor 117 can include size separation elements, for example, one or more screens or apertures.

In the embodiment illustrated in FIG. 1, the oversize sorter 113, mid-size resource recovery plant 115, and fines processor 117 can be configured, using the separation systems described herein, to further separate the portions of the soil mixture that have been separated into an oversize group, a mid-size group and a fines group of materials into additional groups, for example, refuse 119, rock/concrete 121, non-ferrous metal 123, ferrous metal 125, and processed soil 127. The fines processor 117 can be configured to separate the fines group into two groups of materials, for example, one group that includes ferrous metal, and another group that includes processed soil. The processed soil may be transported by a conveyance 111g to a processed soil stockpile 127 where it can be re-used as needed. The fines ferrous metal may be transported by conveyance 111g to a particular location of a ferrous metal depository 125, and from there it can be moved for further processing (e.g., to a re-cycling facility). Conveyance 111g comprises any conveyance or conveyances configured to transport recoverable materials and/or soil from one location to another. For example, conveyance 111g may comprise a tube or duct with a suction applied to one end. As another example, conveyance 111g comprises a trough comprising a flow of fluid.

The mid-size group of recoverable materials separated from the soil mixture 105 by the size separation system 109 can include various recoverable materials (e.g., refuse, rock/concrete, non-ferrous metal, and ferrous metal). Accordingly, the mid-size resource recovery plant 115 may further separate the mid-size material into such recoverable materials and transport these materials by conveyance 111f. Likewise, the oversize sorting 113 also separates and distributes recoverable materials to the refuse group 119, the rock/concrete stockpile group 121, the non-ferrous metal group 123, and the ferrous metal group 125, by conveyance 111e. Conveyances 111e-g can include any suitable conveyance systems or devices that are configured to move the recoverable materials and/or soil.

Still referring to FIG. 1, the refuse 119, rock/concrete stockpile 121, non-ferrous metal 123, ferrous metal 125, and processed soil 127 may be further processed, handled, stored, moved, or recycled. For example, once separated from the soil mixture 105, the ferrous metal 125 can be sold, recycled, reused, further sorted, or otherwise disposed of. Similarly, the rock/concrete 121 can be sold, re-used in construction, crushed, sorted, disposed of, and/or moved. In some embodiments, the processed soil 127 can be mixed with other soil mixtures in order to further process the soil and separate more recoverable materials.

As shown in FIG. 1, the system 100 can be located within a containment structure 107. The containment structure encloses the size separation system 109, the oversize sorting process 113, the mid-size resource recovery plant 115, the fines processor 117, and all of the hoods and ducting of the dust collection system 102. The containment 107 may also enclose some or all of the conveyances 111a-g. The containment 107 is configured to confine dust and other airborne particulate matter within the contained air space. For example, the containment may be a sealed building or other permanent structure. In another example, the containment may be of tent construction. Air containing dust and particulates that is captured by the various dust collection system components 102 within the containment structure 107 is transferred through the connecting duct 103 to the air pollution control system 101. The air pollution control system 101 is driven by a suction blower that draws the captured air through filter cartridges to remove dust and airborne particulates. The volume of air drawn through the air pollution control system 101 filters is sufficient to maintain the entire air space of the containment 107 at a negative pressure relative to ambient thereby further protecting against fugitive dust emissions from the process. The air pollution control system 101 may include at least one dust collector unit containing one or more filtration elements as necessary to achieve the desired filtration capacity. For example, the air pollution control system may be configured as only one cartridge dust collector or one baghouse filter. In another example, the air pollution control system 101 may be comprised of a plurality of separate dust collector units to pull captured air from within the containment 107. In another embodiment, the oversize sorting process 113, the mid-size resource recovery plant 115, and the fines processor 117, can be operated as discrete processors without a containment 107. For example, the air pollution control system 101 can be comprised of a dust collector connected by ducting to an individual containment hood each processor. In another example, the air pollution control system may be comprised of a plurality of separate dust collector units, each of which is dedicated to a single processor.

ILLUSTRATIVE EMBODIMENT

Certain exemplary components and processes of embodiments of the system 100 are described in detail below with reference to FIGS. 2-16. Because there are multiple ways to specifically implement the separation system 100, the following description should not be taken to limit the full scope of the described embodiments. Accordingly, the invention is not limited to this embodiment, but instead includes embodiments having additional aspects/features and embodiments having one or more aspects/features of this illustrative embodiment. Also, to clarify the flow of the system as illustrated in several figures, certain figures include reference letters to demonstrate how components schematically illustrated in one figure may be tied to other components schematically illustrated in one or more other figures.

Figure 2:
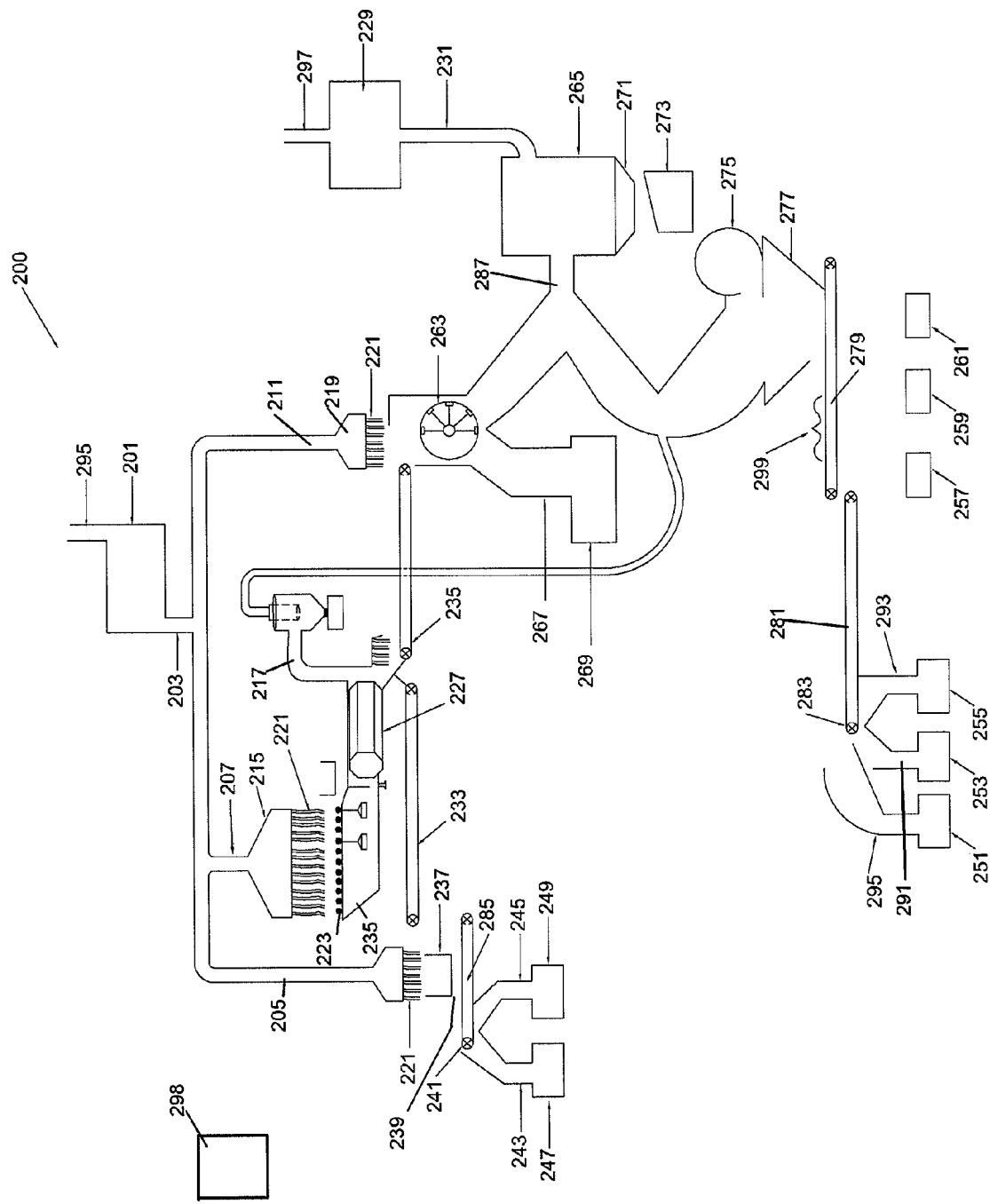
FIG. 2 is a schematic illustrating an exemplary embodiment of a system for recovering materials from a soil mixture.

FIGS. 2-16 illustrate a particular embodiment of a system for recovering materials from soil mixtures. FIG. 2 is a schematic of a system 200 for recovering materials from soil mixtures. The particular embodiment described is a configuration that would be applied to a worst case scenario wherein the soil mixture in process meets the regulatory definition of a hazardous waste or hazardous material. The "hazardous" embodiment provides for the highest level of protection for control of fugitive dust emissions throughout the process. Methods and devices to eliminate and control dust and/or other airborne particulates can be used with each step/stage of this embodiment.

FIG. 2 illustrates an overview of the system 200, and the other figures illustrate particular separation aspects and methods of the system 200. Certain illustrated aspects need not be included in all embodiments of the invention, nor is every detail illustrated for the sake of clarity of this disclosure. In some embodiments, system 200 optionally includes a liquid supply system 298 that can include a water source, or a source of any other liquid. For example, the liquid supply system 298 may be a hose, spigot, bottle, bucket, natural body of water, or a more extensive spray system that is manually or automatically actuated (e.g., by a trip switch or timer). As an optional step in processing the soil mixture, the liquid supply system 298 may be used to regulate the moisture content of the soil mixture before or while it is being processed by the system 200. For example, a hose may be used to spray a source of soil mixture or a source of soil mixture may be exposed to a humidifier. Additionally, the liquid supply source 298 may be used at multiple points in the system 200. For example, a hose may be used to spray a source of soil mixture at numerous points throughout the system 200. The regulation of the moisture content of a source of soil mixture can minimize the creation of dust or expulsion of particulate matter during the process. However, in other embodiments, no liquid supply system is required by system 200 to process the soil mixture and particulate matter is collected as discussed below, for example, if dust is not a prioritized concern or if natural humidity is sufficient to minimize creation of dust.

The material recovery process can begin when a soil mixture (sometimes referred to herein as a "batch" or a "batch of soil mixture") is input through barrier strips 221 disposed above a grizzly screen 223. The barrier strips 221 are attached to a hood 215 and are configured to help confine dust and small recoverable materials under the hood 215 when batches of soil mixture are input through the grizzly screen 223 to feed hopper 225. The barrier strips 221 can be pushed apart to allow ingress for a batch of soil mixture. When the soil mixture is deposited onto the grizzly screen 223, the barrier strips 221 help to contain material (e.g., dust and recoverable materials) that may become airborne or move as a result of transferring the soil mixture to the grizzly screen 223 and feed hopper 225. The barrier strips 221 can be flexible plastic, cloth, canvas, other flexible material, or a more rigid material configured to be moveable to allow the soil mixture to be fed into the feed hopper 225 while providing a barrier to dust or particulate matter. In some embodiments, the system 200 operates under a negative pressure relative to ambient pressure to bias particulate matter or recoverable materials toward the system 200, in other words to facilitate containing airborne particulates.

In this embodiment, a first separation of the soil mixture occurs after a portion of the soil mixture passes through the barrier strips 221 and is screened by the grizzly screen 223, and some of the soil mixture passes through the grizzly screen 223. The grizzly screen 223 includes a series of parallel bars configured at a predetermined spacing to separate large or oversized materials from the soil mixture. The grizzly screen 223 covers an entrance to the feed hopper 225. After passing through the grizzly screen 223 and entering the feed hopper 225, the soil mixture (now no longer containing large/oversize materials) enters a second separator having a rotating drum screen 227 separation element, an embodiment of which is described further with reference to FIGS. 5 and 6.

The rotating drum screen 227 comprises numerous screens with each screen having a plurality of apertures. The apertures in the rotating drum screen 227 may vary in size and be configured to allow objects that may fit within the apertures to pass through the screens and out of the rotating drum screen 227. The rotating drum screen 227 separates the soil mixture by size into two groups: one group that can include soil and other recoverable materials that cannot pass through the apertures in the rotating drum screen 227, and another group that includes soil and other recoverable materials that can pass through apertures in the rotating drum screen 227. A hood 217 is positioned near the exit of the rotating drum screen 227 to help control airborne materials. The hood 217 is connected to a duct 209 which moves airborne materials to a pollution control system.

Still referring to FIG. 2, the group of soil and recoverable materials that cannot pass through the apertures within the rotating drum screen 227 exits the end of the rotating drum screen 227 and is transported by a conveyance 235 for further processing. The other group, comprising soil and recoverable materials that pass through the rotating drum screen 227 is transported by a conveyance 233 for further processing. Conveyances 233 and 235 can include any means of transporting soil and recoverable materials. For example, conveyance 233, may include a conveyor belt. As another example, conveyance 235 may include a small tractor, a sled, and/or a chain drag.

Conveyance 233 transports a portion of the soil mixture that passed through the rotating drum screen 233 to a feed hopper 237. A hood 213 is disposed near conveyance 233 and feed hopper 237 to intake airborne materials (e.g., to control dust generated from moving the soil mixture). The hood 213 is attached to a duct 205, a part of the dust control system. Feed hopper 237 comprises an adjustable gate 239, and is positioned over a conveyance 285 such that the soil mixture in the feed hopper 237 falls onto the conveyance 285. Conveyance 285 transports the soil mixture from the feed hopper 237 through the adjustable gate 239 (which is used to control the flow of the soil mixture) to a drum magnet 241. Upon reaching drum magnet 241, ferrous metal recoverable materials are diverted into a chute 245 and collected in a bin 249. Non-ferrous soil and recoverable materials pass over drum magnet 241 into a chute 243 and are collected in a bin 247.

Also shown in FIG. 2, conveyance 235 transports another portion of the soil mixture from the rotating drum screen 227 to a drum magnet 263. A dust control hood 219 is disposed near the conveyance 235 and the drum magnet 263. Ferrous metal recoverable materials that are attracted to part of drum magnet 263 and be diverted through a chute 267 to a bin 269. Portions of the soil mixture that are not attracted to part of drum magnet 263 pass over drum magnet 263 and fill an air classifier/scrubber system which is illustrated in more detail in FIG. 10.

Figure 10:
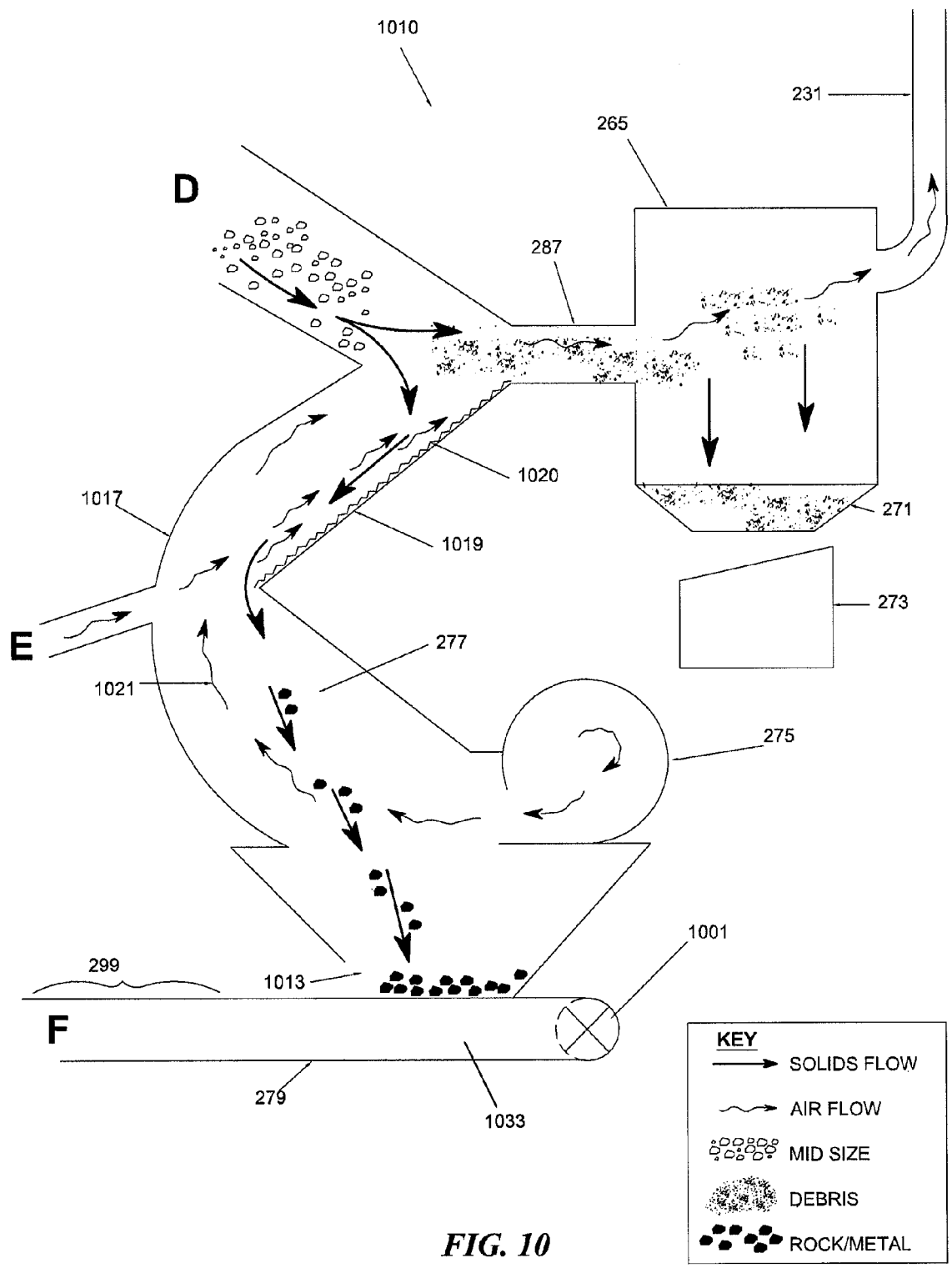
FIG. 10 is a schematic illustrating an embodiment of a combination air classifier/scrubber system as depicted in FIG. 2.

Illustrated in FIG. 2, and as shown in more detail in FIG. 10, the air classifier/scrubber system includes an air chamber 277 coupled with a blower 275. The blower 275 creates an air stream that is directed upwards in the air chamber 277. When the portion of the soil mixture that is not attracted to the drum magnet 263 enters the air chamber 277, it encounters this air stream. Accordingly, recoverable materials and soil that are susceptible to air separation enter a channel 287 that connects the air chamber 277 to a vestibule 265. Vestibule 265 is connected to a duct 231 and a release door 271. The release door 271 releases recoverable materials and soil that settle in the vestibule 265 to a collection bin 273. The separated group of the soil mixture that enters the air chamber 277 that is not moved by the air flow to the channel 287 and vestibule 265 passes through air chamber 277 to a conveyance 279. This conveyance 279 may include a sorting area 299. The sorting area 299 allows people or other automatic or semi-automatic sorting devices (not shown) access to the recoverable materials as they pass by on conveyance 279. The people, or other sorting devices, may sort the recoverable materials that are transported on conveyance 279 through the sorting area 299 into distinct groups (for example, brass, copper, and lead) for recycling or reuse.

Still referring to FIG. 2, conveyance 279 transports a portion of the soil mixture processed by the air classifier/scrubber system to another conveyance 281. In some embodiments, conveyance 279 and conveyance 281 are part of the same conveyance. In one embodiment, conveyance 281 includes an eddy current generator 283 which is illustrated further in FIGS. 12 and 13 and described in the corresponding text. The eddy current generator 283 creates eddy currents in metals, and uses this effect to separate non-ferrous metal from soil and other recoverable materials. For example, conveyance 281 transports a portion of the mixture near the eddy current generator 283. When non-ferrous metal recoverable materials in the soil mixture are near the eddy current generator 283, eddy currents are induced within these recoverable materials. The induced eddy currents cause these non-ferrous metal recoverable materials to move away from the eddy current generator 283 and conveyance 281 which allows the separation of such materials. When ferrous metal recoverable materials approach the eddy current generator 283 they are attracted to the eddy current generator and remain on conveyance 281 until they move away from the eddy current generator. The non-ferrous metals separated by the eddy current generator are directed into a chute 295 which leads to a collection bin 251. Non-ferrous recoverable materials which are not affected by the eddy current generator 283 pass through a chute 291 into a collection bin 253. Any remaining ferrous metal recoverable materials that are not separated by drum magnet 263 are attracted to the eddy current generator 283 and pass through chute a 293 into a collection bin 255 after they are transported past the eddy current generator 283.

As shown in FIG. 2, duct 205, duct 207, duct 209, and duct 211 all lead into a duct 203. Duct 203 is connected to a dust collector 201. Dust collector 201 has an exhaust outlet 295. Also, duct 231 leads directly into another dust collector 229, dust collector 229 also has an exhaust outlet 297. In another embodiment, duct 205, duct 207, duct 209, duct 211, and duct 231 may lead into a single dust collector.

Figure 3:
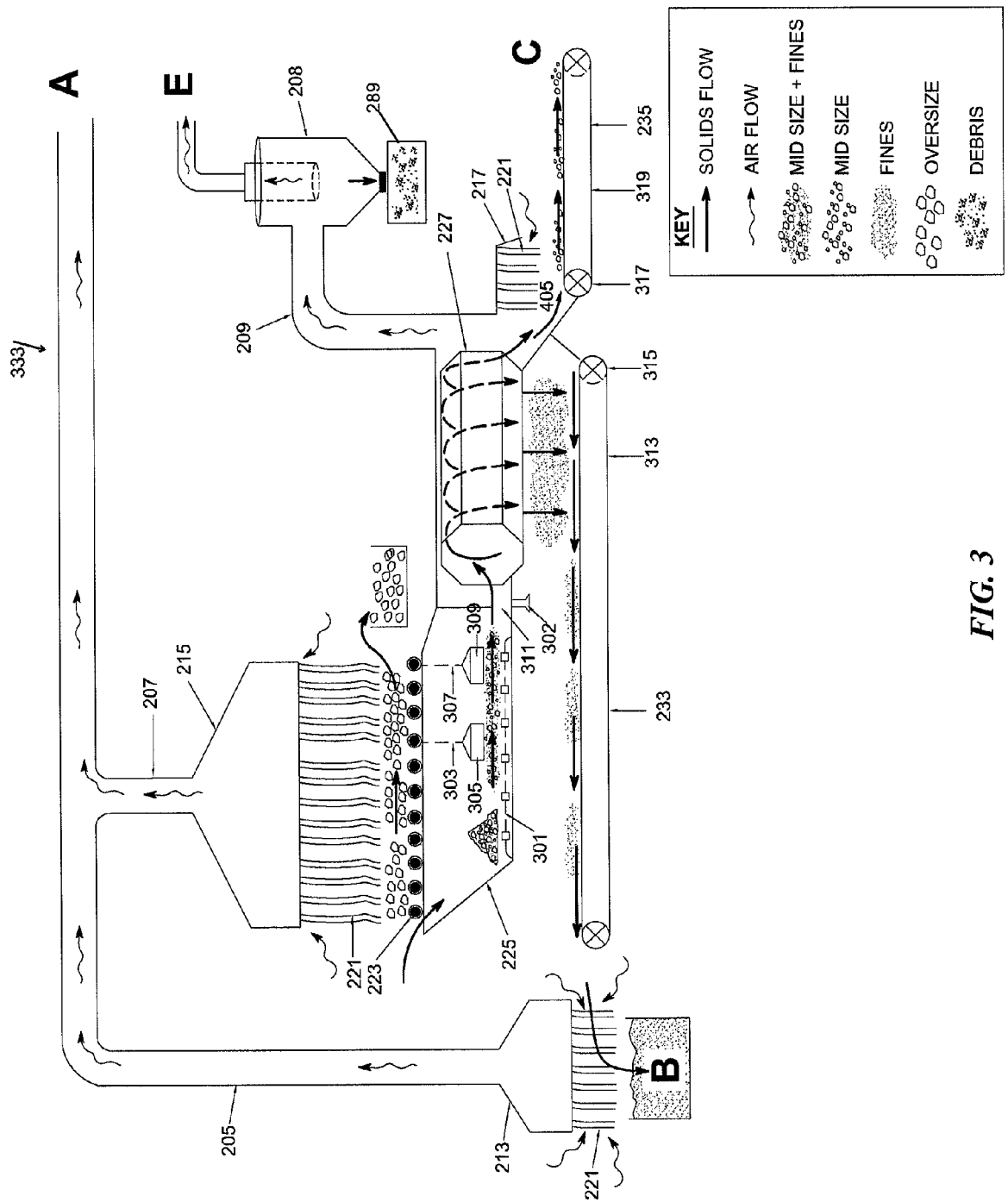
FIG. 3 is a schematic illustrating a size separation system of the system shown in FIG. 2.

Turning now to FIG. 3, a portion of the system 200 is shown and described in further detail, according to one embodiment. FIG. 3 shows a size separation system 333 that includes a feed hopper 225 and grizzly screen 223. The grizzly screen 223 covers the opening to the feed hopper 225 and separates large objects from the batch of a soil mixture that is placed in the feed hopper 225.

Figure 7:
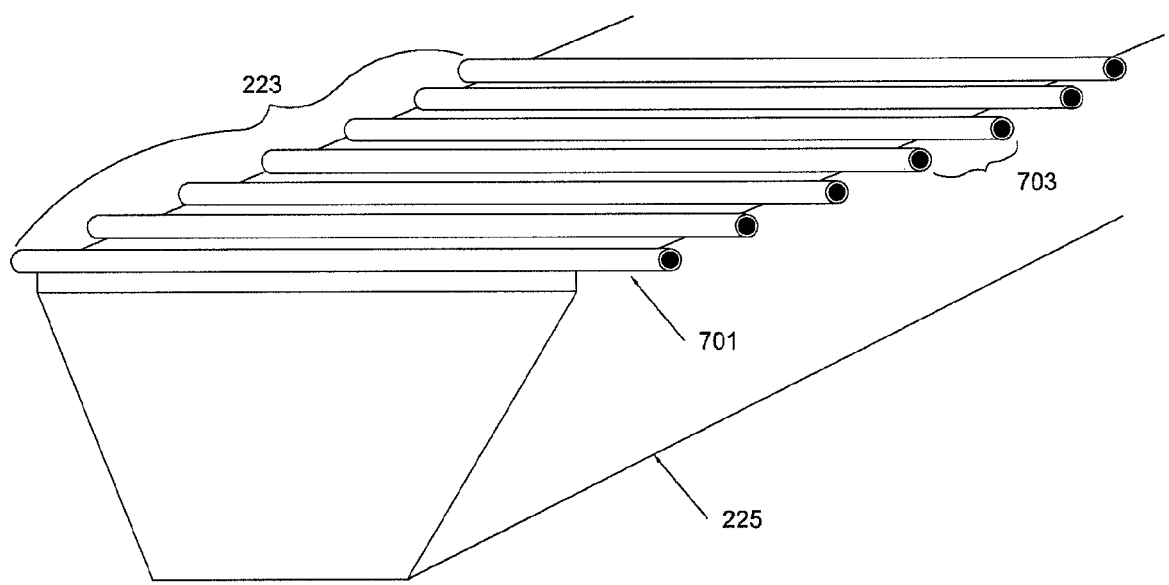
FIG. 7 is a schematic illustrating one embodiment of a grizzly screen that can be used as a separation element.

Turning to FIG. 7, the grizzly screen 223 is shown in further detail, according to one embodiment. The grizzly screen includes a set of parallel bars 701. The bars 701 may be co-planar. The bars are evenly spaced from one another creating clearances 703. In one embodiment, the clearances can be uniformly sized and the uniform size of the clearances 703 controls the size of soil and other recoverable materials that can pass through the grizzly screen 223. For example, the clearances may be 3.5 inches. The grizzly screen 223 may lie flat above the opening to the feed hopper 225. In such cases, recoverable materials that are too large to pass through the grizzly screen 223 are collected or swept from the grizzly screen 223 over time in order to clear the clearances 703 for the smaller recoverable materials and soil that may pass therethrough. In other embodiments, the grizzly screen may be slanted to allow large objects that do not fit within the clearances 703 to slide off of the grizzly screen 223.

The feed hopper 225 includes a conveyance 301. An example of the conveyance 301 may be a chain drag or similar conveyance. The conveyance 301 transports soil and other recoverable materials from left to right towards the rotating drum screen 227. The conveyance 301 can be configured to transport soil and recoverable materials at varying speeds or throughputs. For example, the conveyance 301 can be a variable speed conveyance and transport soil and recoverable materials at about 18-19 inches per minute. In another example, conveyance 301 transports soil and recoverable materials at 2-36 inches per minute. Alternatively, depending on the size of the conveyance and the configurations of other parts of the system, the speed of the conveyance may be adjusted to determine overall throughput of the system 200. For example, the conveyance 301 can be configured to throughput 3-4 tons of soil mixture per hour. The speed or throughput of the conveyance 301 can be adjusted by means of a variable speed control to affect retention time within the system 200 or can be varied to adjust to changed conditions of the input. For example, the speed of the conveyance 301 may be adjusted to accommodate different conditions of the feed material such as moisture content and/or the size and shape of recoverable materials within the soil.

As shown in FIG. 3, before exiting the feed hopper 225, conveyance 301 carries the soil mixture under flow regulators 305, 309. Flow regulators 305, 309 can hang from the grizzly screen 223 (or another supporting structure) by chains 303, 307. In one embodiment, the flow regulators 305, 309 comprise weights or blocks that are configured (by size, height, and/or weight) to control the height of soil and recoverable materials that may pass underneath them on conveyance 301. The distance from the regulators 305, 309 to the conveyance 301 is adjustable to regulate the height of the flow of soil and recoverable materials that enters the rotating drum screen 227. For example, the clearance between the flow regulators 305, 309 and the conveyance 301 can be about 5 inches in order to maintain a flow of soil mixture having height of around 5 inches. In this example, if conveyance 301 transports a soil mixture that has a height greater than 5 inches as measured from the conveyance 301, the soil mixture will be restricted when it contacts the flow regulators 305, 309, and adjusted by contact with the regulators 305, 309 such that the height of the flow after passing underneath the regulators 305, 309 is about 5 inches high. To adjust the clearance between the conveyance 301 and the flow regulators, the length of chains 303 and 207 can be adjusted. To increase throughput or production, the clearance may be increased to allow more of the soil mixture to flow into the rotating drum screen 227. In some embodiments, the clearance between flow regulator 305 and the conveyance 301 is different than the clearance between flow regulator 309 and the conveyance 301. For example, the flow of soil mixture into the rotating drum screen 227 may be regulated in two steps with the clearance between the first flow regulator 305 and the conveyance 301 being about 7 inches and the clearance between the second flow regulator 309 and the conveyance 301 being about 4 inches.

Still referring to FIG. 3, after the flow regulators 305, 309, the conveyance 301 carries the soil mixture to adjustable gate 311. As shown in FIG. 3, adjustable gate 311 also controls how much material enters the rotating drum screen 227. The height and size of the opening of the gate 311 may be adjusted to regulate efficiency and throughput. For example, expanding the gate 311 allows more throughput of the soil mixture into the rotating drum screen 227 but decreases the quality of the product exiting the rotating drum screen 227 of the system 200. Also, the size and shape of the gate 311 may be adjusted to meet specific conditions. For example, certain feed materials may contain more irregularly shaped or elongated recoverable materials such as pieces of rebar. The adjustable gate 311 can be configured with curved edges to prevent binding thus allowing these objects to pass more easily through gate 311 into the rotating drum screen 227.

Figure 6:
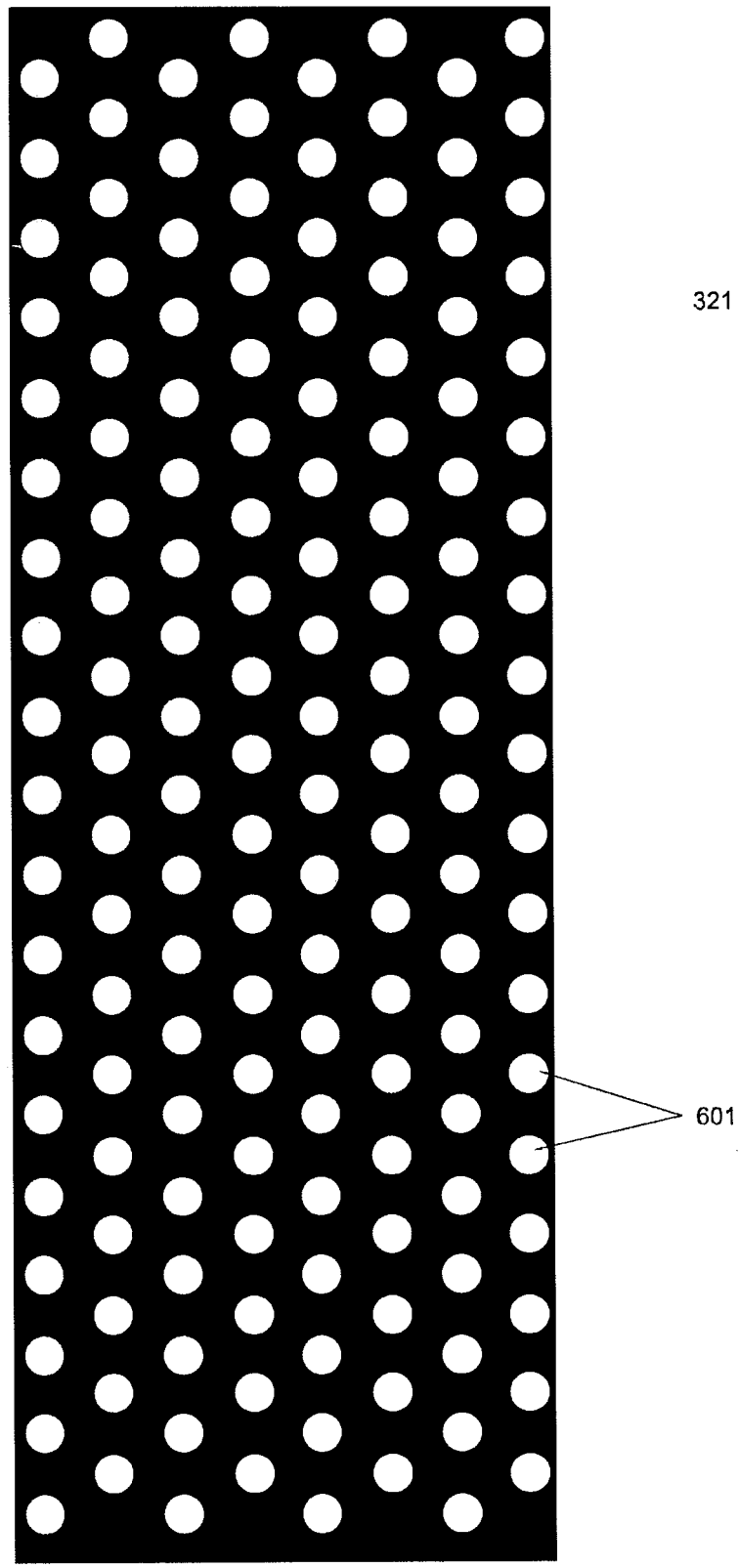
FIG. 6 illustrates a top plan view of one embodiment of one screen panel of a single rotating drum screen panel.

As shown in FIG. 3, once the recoverable material bearing soil passes through the adjustable gate 311, it enters the rotating drum screen 227. The soil mixture passes along the length of the rotating drum screen 227 by gravity due to the slight declination of the rotating drum screen 227 (right to left as depicted). The angle of declination may be adjusted by means of a slope adjustment jack 302. For example, the angle of rotating drum screen 227 declination may be set at 4 degrees from horizontal. The rotating drum screen 227 includes screen panels, 321a-h, The rotating drum screen 227 panels may be configured in the form a tubular polygon for example an octagon or hexagon. In another embodiment, the rotating drum screen 227 includes one panel that forms a cylinder or curvilinear tube. The rotating drum screen panels 321a-h are removable and may be removed and replaced with alternative screen panels to adjust performance. As shown in FIG. 6, a rotating drum screen panel 321 includes apertures 601. The apertures may be any shape and may vary in size to achieve specific screening requirements. In FIG. 6, the apertures 601 are circular and each aperture has the same size. However, the apertures 601 may each be differently shaped, for example, a first aperture 601 can be can be round and a second aperture 601 can be square. Further, the apertures may each vary in size. For example, the apertures 601 may be circular with 0.125 inch diameters. This size may be increased or decreased depending on the screening requirements for a particular feed material. For example, the apertures 601 may range in size between about 0.10 square inches and 5 square inches. The size and shape of the apertures 601 may also be varied to adjust efficiency and throughput. For example, a smaller aperture may increase the quality of fine product while decreasing throughput by requiring the conveyance 301 to run at a slower speed. Additionally, apertures 601 may be evenly or unevenly distributed on a panel 321. The overall rate of processing or throughput through system 200 is dependent on two factors: 1) the amount of material that passes through gate 311 which is in turn dependent on the velocity of conveyance 301 and both the height and width of the gate opening, and 2) retention time within the rotating drum screen 227, which is influenced primarily by the angle of declination and secondarily by the percent of open area of the apertures.

Figure 5:
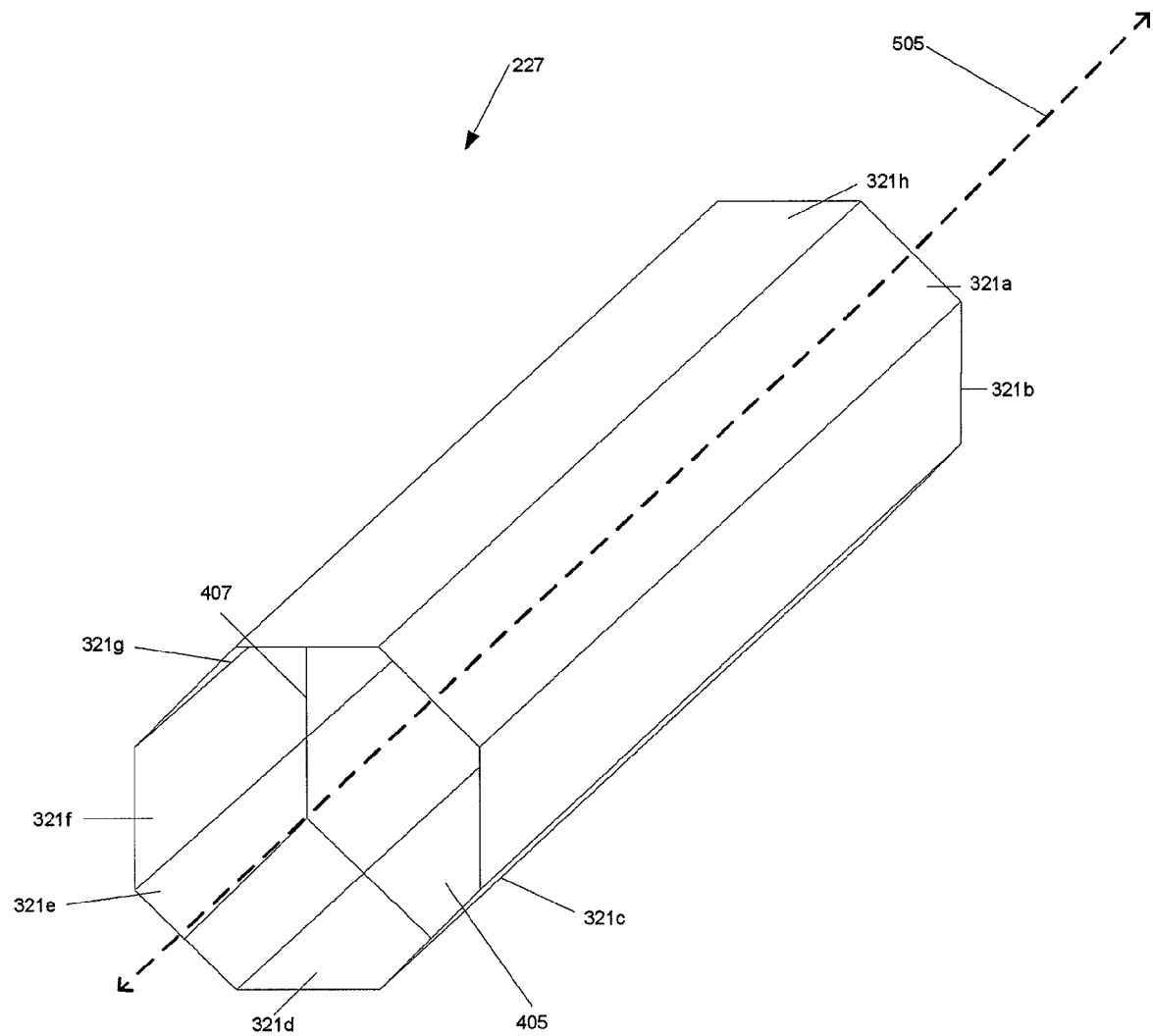
FIG. 5 is a schematic illustrating a perspective view of the rotating drum screen depicted in FIGS. 2-4.

As shown in FIG. 5, the rotating drum screen 227 includes a discharge chamber 405. The rotating drum screen 227 is also configured to rotate around its longitudinal axis 505 by rotation member 407. This rotation moves the soil and other recoverable materials across the rotating drum screen panels 321a-h and exposes the recoverable materials and soil to apertures 601. Turning back to FIG. 3, soil and recoverable materials that are small enough to pass through the apertures 601 in the rotating drum screen panels 321a, 321b, 321c may fall to conveyance 233. Soil and recoverable materials that are not small enough to pass through the apertures in the rotating drum screen panels 321a, 321b, 321c, pass through the length of the rotating drum screen 227 to the discharge chamber 405. Lighter weight debris type materials that pass from the rotating drum screen 227 to the discharge chamber 405 may be extracted into duct 209 by the suction created by cyclone 208.

These debris materials are subsequently separated by the action of cyclone 208 and deposited into a bin 289 for disposal. The air flow exiting cyclone 208, which may contain fine particulate matter, is passed on to the combination air classifier/scrubber system 1010. Conveyances 233 and 235 transport the soil and other recoverable materials exiting the rotating drum screen 227 for further processing. Screen panels 321a-h may be fabricated from pre-formed perforated metal and may vary in size and thickness. For example, the screen panels 321a-h may be cut from perforated metal purchased from McNichols.com and be cut to rectangles with a length of about 7 feet and a width of about 17.5 inches.

In the exemplary embodiment shown in FIG. 3, conveyance 233 is a conveyor belt with belt 313 and pulley 315. All of the details and parts of the conveyances 233, 235 (and other portions of the system) are not illustrated for clarity of the disclosure. However, conveyance 233 may include other conveyances including but not limited to a chain drag, a small tractor, and/or an angled chute. Similarly, conveyance 235 also includes a conveyor belt with belt 319 and pulley 317. The conveyor 235 may also include any other type of a conveyance capable of transporting soil and recoverable materials from the rotating drum screen discharge chamber 405 to another location for further processing. Conveyances 235 and 233 may be variable speed conveyances configured to transport soil and recoverable materials at varying speeds or throughputs. In one embodiment, without automated conveyances, the rotating drum screen 227 may separate the soil and recoverable materials into two piles, a pile that passes through the screens and another pile that does not. The two piles may then be manually transported to other locations for further processing.

Figure 14:
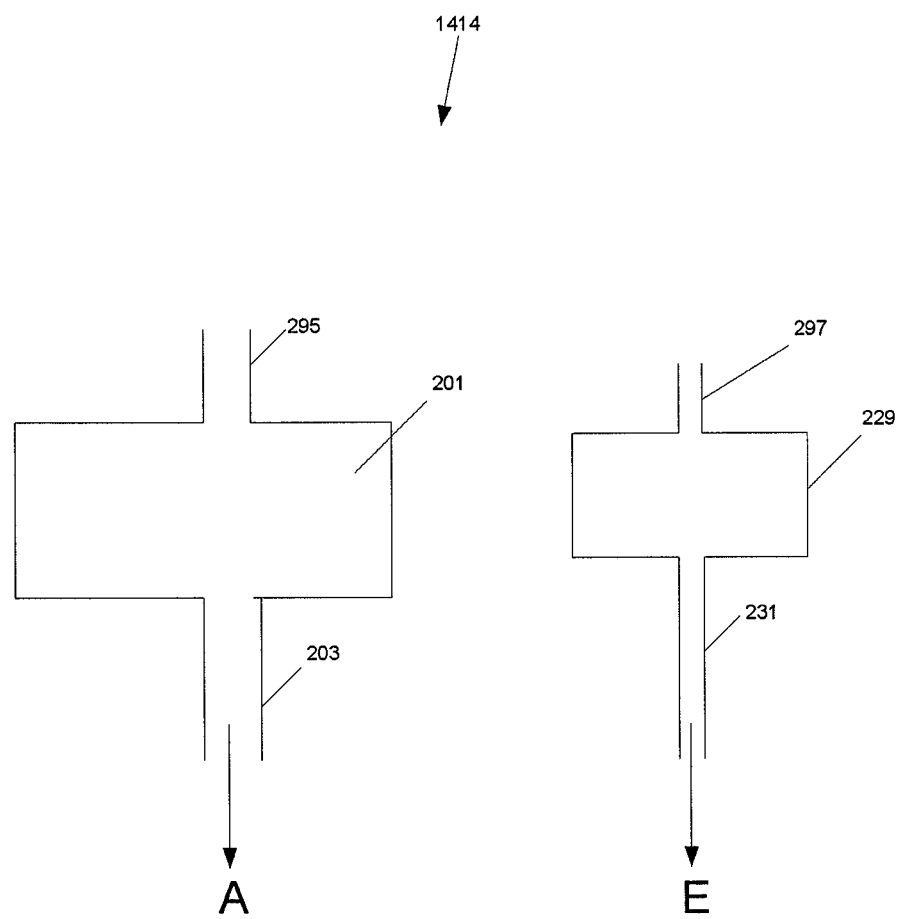
FIG. 14 is a schematic illustrating one embodiment of an air pollution control system that can be used in the system depicted in FIG. 2.

As shown in FIG. 3, a dust control hood 217 is disposed near the rotating drum screen discharge chamber 405. The rotating drum screen discharge chamber 405 constitutes a transfer point in the system 200 because it is a point at which soil and/or other recoverable materials are being transferred from a conveyance to another conveyance, from a conveyance to a processor, from a processor to another processor, or from a processor to a conveyance at this and other transfer point particles from the soil mixture may become airborne. The hood 217 is attached to duct 209. Another hood 215 is disposed near another transfer point, above the grizzly screen 223, and attached to duct 207. The system 200 contains a hood near each transfer point where soil and recoverable materials are transferred. As shown in FIG. 14, ducts 207 and 209 are ultimately connected with dust collector 201. Dust collector 201 creates suction in the ducts connected to the hoods positioned near transfer points in order to pull dust and particulate matter, for example, airborne contaminants, from the areas near the transfer points to the dust collector. Dust and particulate matter that enters the dust collector 201 are filtered from the air, and the filtered clean air is exhausted through exhaust outlet 295. An example of a suitable dust collector 201 is a DUST-HOG® SUPRA-BLAST manufactured by United Air Specialists of Ohio, however any dust collector capable of pulling in dust and particulate matter from the transfer points may be used.

In some jurisdictions, the dust collection process is more important than in other jurisdictions. For example, in California, certain small contaminants contained in dust produced at transfer points may be classified as hazardous waste. Thus, the dust produced at such sites should be minimized to avoid exposure to the ambient air and any persons working near the system. In other embodiments, hoods 215, 217, and dust collector 201 are optional as dust or particulate matter found near transfer points does not comprise contaminants or hazardous waste.

Figure 4:
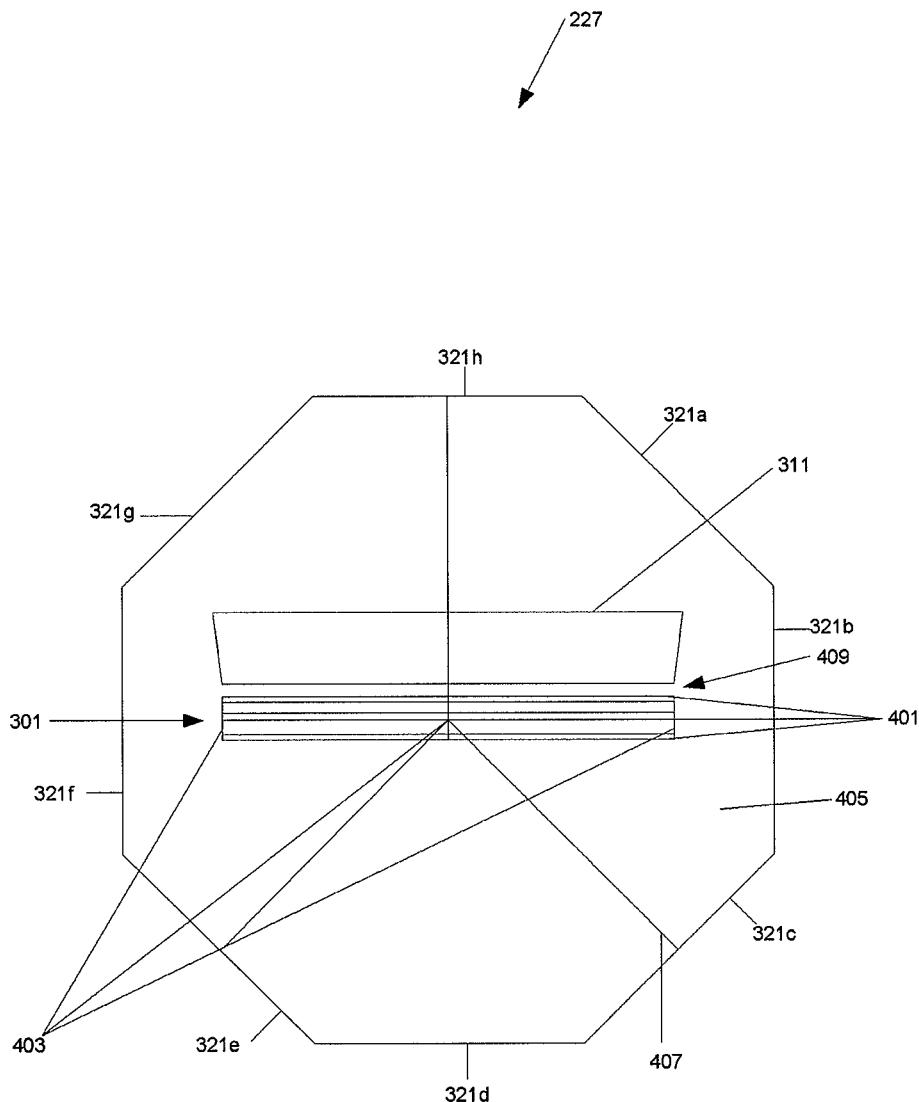
FIG. 4 is a schematic illustrating an end view of a portion of the size separation system depicted in FIG. 3.

Turning now to FIG. 4, the end of the rotating drum screen 227 is shown exposing the rotating drum screen discharge chamber 405. The conveyance 301 and adjustable gate 311 can be seen when viewed through the rotating drum screen discharge chamber 405. In the illustrated embodiment, the conveyance 301 is a chain drag with cross bars 401 and chains 403. However, as mentioned above, the conveyance 301 may be any other conveyance for example a conveyor belt. The bottom of the adjustable gate 311 defines a clearance 409 between the gate and the top of the conveyance 301. This clearance 409 controls the flow of soil mixture into the rotating drum screen 227 and may be lowered or raised to adjust the flow accordingly.

Figure 8:
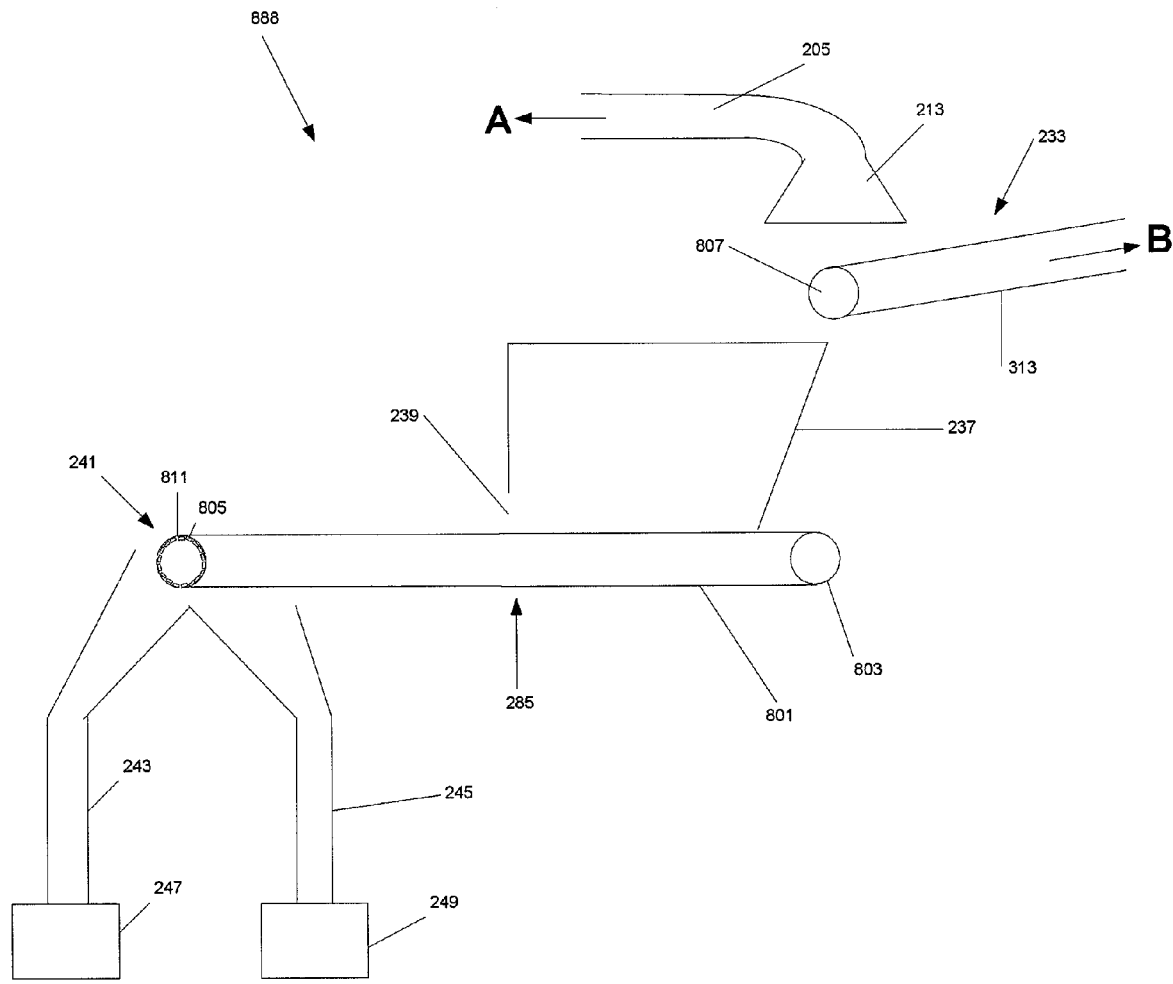
FIG. 8 is a schematic illustrating one embodiment of a magnetic separator system that can be used in the system depicted in FIG. 2.

FIG. 8 illustrates another separator of the system 200 that processes a portion of the soil mixture that passes through the rotating drum screen 227 is shown in further detail, according to one embodiment. The separator includes a magnetic separation system 888. The magnetic separation system 888 comprises a feed hopper 237. Conveyance 233 transports recoverable materials and soil that pass through the rotating drum screen 227 panel apertures 601 to the feed hopper 237. In this example, the conveyance 233 includes a conveyor belt with belt 313 and pulley 807. However, as mentioned above, the conveyance 233 may include other conveyances and be configured to be a variable speed conveyance. The separation system 888 includes a dust control hood 213 positioned near the conveyance 233 and feed hopper 237. The hood 213 is optionally connected to duct 205 and provides a suction to collect dust created when the soil and recoverable materials are transferred from the conveyance 233 to the feed hopper 237.

As shown in FIG. 8, feed hopper 237 is positioned near and/or rests upon a portion of conveyance 285. The conveyance 285 includes a conveyor belt with belt 801 and pulley 803. The conveyance 285 transports a portion of the soil mixture (having soil and other recoverable materials) from the feed hopper 237 from right to left through adjustable gate 239. The height of adjustable gate 239 may be adjusted in order to vary the flow of soil and recoverable materials that pass through the gate. For example the height may be lowered to restrict the flow of the soil and it may be raised to increase the flow of the soil mixture. The adjustable gate 239 may be used to adjust the efficiency and throughput of the system 200 to meet different requirements.

Still referring to FIG. 8, this separation system carries the soil mixture through the adjustable gate 239 and within the proximity of the drum magnet 241. The belt 801 moves around the drum magnet 241 and can rotate the drum magnet, according to this embodiment. The drum magnet 241 in this example includes a plurality of magnets 805 disposed inside a drum 811. For example, the drum 811 may contain 18 rows of 8 magnets, and the drum magnet 241 may have a length of about 20 inches and a diameter of about 12 inches. The magnets 805 inside the drum 811 may be blocks with dimensions of about 2 inches by about 1.5 inches by about 1.5 inches. The drum magnet 811 can be assembled using a rotatable drum and a plurality of magnets, or purchased from a supplier. For example, a suitable drum magnet may be purchased from Eriez of Pennsylvania, also found at eriez.com.

When the soil and recoverable materials reach the drum magnet 241, such that they are subject to its magnetic field, ferrous metal recoverable materials are attracted to the magnets 805 inside the drum 811 through the belt 801. The ferrous metal recoverable materials remain attracted to the magnets 805 until the belt passes away from the drum magnet 241. Once the belt 801 is no longer over the drum magnet 241, the ferrous metal recoverable materials are no longer held to the belt 801 by magnetic attraction and the recoverable materials fall into a chute 245. Chute 245 collects the ferrous metal recoverable materials and directs them into a collection bin 249. Non-ferrous recoverable materials are not attracted to the magnets 805 and fall off of the end of the conveyance 285 into a chute 243. Chute 243 collects the non-ferrous soil and recoverable materials and directs them into a collection bin 247. In one embodiment, the non-ferrous recoverable materials collected in collection bin 249 may be used as "soil" for construction purposes although the collected materials may comprise soil in addition to other small recoverable materials. In some embodiments, the ferrous metal recoverable materials collected in collection bin 247 may be sold, recycled, or disposed of.

Still referring to FIG. 8, the strength and quantity of magnets 805 inside the drum magnet 241 may be adjusted to meet varying requirements and conditions from site to site. For example, certain sites may contain many small ferrous metal recoverable materials mixed with soil. These ferrous metal recoverable materials may be recycled and have economic value. Accordingly, in such cases a stronger magnetic force is desired in order to recoup as much ferrous metal from the soil as possible.

Figure 9:
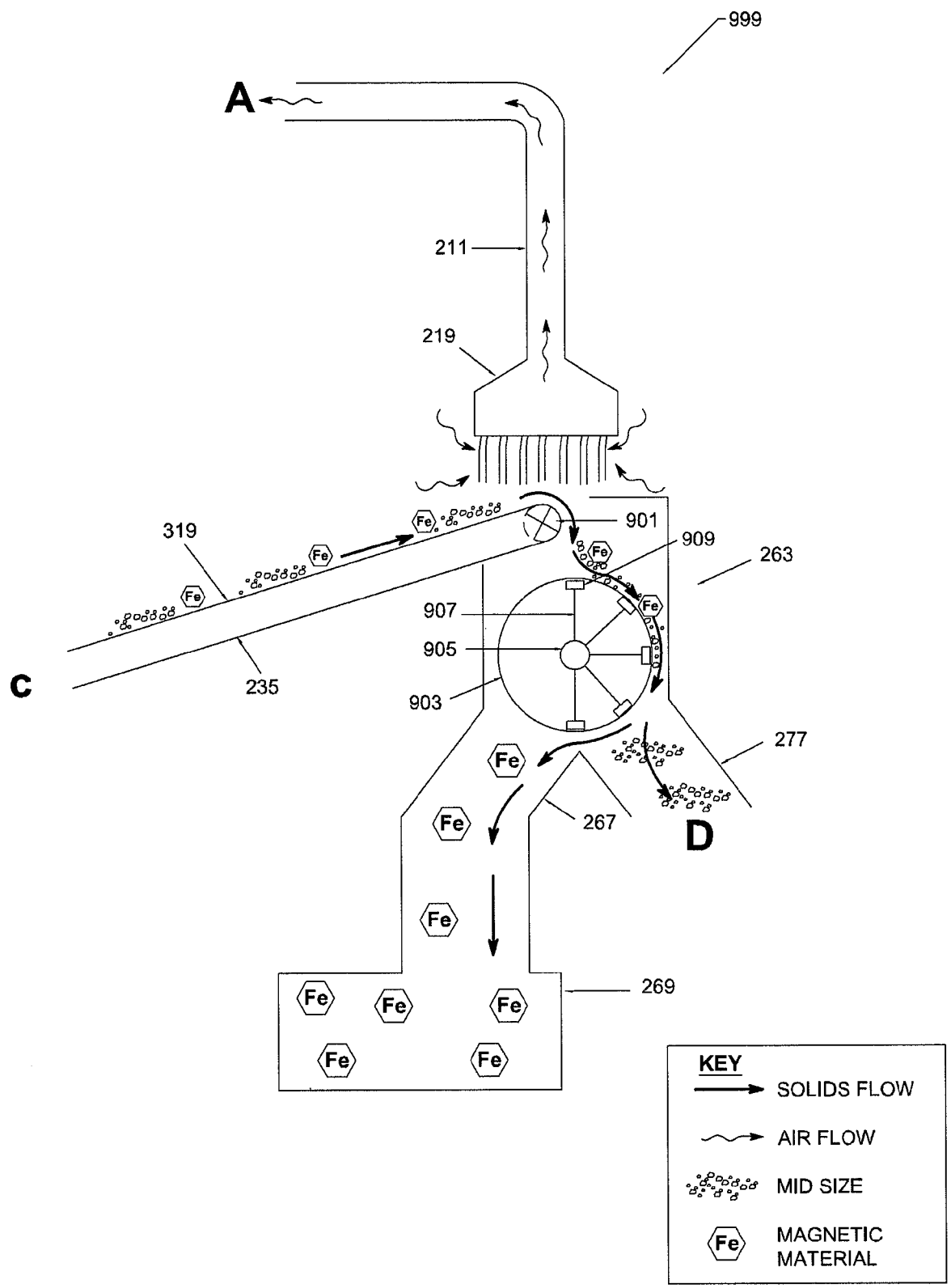
FIG. 9 is a schematic illustrating another magnetic separator system that can be used in the system depicted in FIG. 2.

Turning now to FIG. 9, another separation system in the system 200 is shown in further detail, according to one embodiment. FIG. 9 shows a magnetic separation system 999 that includes a drum magnet 263 which can be manufactured or purchased from a supplier. For example, a Type CC Model Drum Separator may be purchased from Eriez of Pennsylvania. In one embodiment, the drum magnet 263 includes a center shaft 905 and supports 907 that extend from the center shaft 905 towards the edge of the drum 903. The supports 907 each support a magnet 909 at the tips of the support. The magnets 909 and supports 907 should be configured so that about only half of the circumference of the drum 903 is proximally exposed to the force of the magnets 909. In one example the magnet drum 903 is about 18 inches in diameter and has a length of about 30 inches. The drum 903 can rotate relative to center shaft 905 which remains fixed. Thus, the drum 903 rotates over the magnets 909 so that about one-half of the surface of the drum 903 is in proximity to the magnets 909 and thus proximally exposed to magnetic field of the magnets 909 at any given time. In the illustrated embodiment of FIG. 9, the drum 903 rotates clockwise. The speed of rotation of the drum 909 may be variable, and may be varied to adjust throughput and efficiency. For example, a faster rotation of the drum 903 increases throughput of the soil mixture through the system 200 while a slower rotation of the drum 903 increases efficiency (e.g., allows better separation and recovery to occur). As discussed above, the speed of conveyance 235 can also variable and may be used to regulate efficiency and throughput of the system 200.

Still referring to FIG. 9, a hood 219 can be positioned near the drum magnet 263 and the end of the conveyance 235. The hood 219 is connected to duct 211 and connected to a pollution control system that provides a suction to collect dust and/or airborne particulate matter that is created when the soil mixture is transferred from the conveyance 235 to the drum magnet 263. In the illustrated embodiment, conveyance 235 is a conveyor belt with a belt 319 and pulley 901. The conveyance 235 transports soil and recoverable materials from the rotating drum screen discharge chamber 405 to the drum magnet 263. At the end of the conveyance 235, the soil and recoverable materials drop from conveyance 235 to the drum magnet 263. Once the soil and recoverable materials contact the drum magnet, the ferrous metal recoverable materials in the soil mixture are attracted to the rotating drum 903 by the magnets 909 and remain fixed to the surface of the rotating drum 903 due to the magnetic field as the drum 903 passes over the magnets 909. Once a portion of the drum 903 rotates to a point where magnets do not lie beneath that particular portion of the drum 903, the ferrous metal recoverable materials are no longer exposed to a magnetic field that is strong enough to hold them to the surface of the drum 903. When the magnetic field is insufficient to hold the ferrous metal recoverable materials to the drum 903, the ferrous metal recoverable materials fall from the drum 903 into chute 267, which directs the ferrous metal recoverable materials to a collection bin 269. Non-ferrous recoverable materials drop from the conveyance 235 to the drum magnet 263, and they are not attracted to the rotating drum 903 by the magnetic force of magnets 909. Accordingly, non-ferrous recoverable materials pass over the surface of the drum magnet 263 and are directed into an air chamber 277 which is the intended input for the air classifier/scrubber system 1010 further described below in connection with FIG. 10. The ferrous metal recoverable materials collected by collection bin 269 may be reused, recycled, disposed of, or sold.

FIG. 10 illustrates another separation system of the system 200 shown in FIG. 2 in further detail, namely the combination air classifier/scrubber system 1010, according to one embodiment. The air classifier/scrubber system 1010 includes an air chamber 277 and blower 275. The air chamber 277, in this embodiment, is enclosed to contain the soil mixture as it is exposed to a separation air flow. The air chamber 277 of this embodiment includes a chute which receives a portion of the soil mixture from the separation system illustrated in FIG. 9, and a portion where the received material is exposed to an air flow for separation of certain components of the soil structure. This exemplary air chamber 277 also includes a curved surface illustrated in FIG. 10 as the left side 1017 of the air chamber 277, and another surface which may be straight, angular, or curved, illustrated as the right side 1019. The internal surface of the downward sloping right side 1019 of the air chamber 277 includes a corrugated surface 1020 to enhance the separation of fine particulates from failing particles. The corrugated surface 1020 can include ridges to disrupt and retard the flow of recoverable materials and soil that pass there over. The blower 275 is positioned towards the bottom of the air chamber 277, here on the right side, the curved surface (left side 1017) is disposed opposite to the blower 271. The blower 275 is configured to create a stream of air 1021 that is directed upwards inside the air chamber 277. The stream of air 1021 is directed upwards by the curved surface of the left side 1017 of the air chamber 277 and by the shape of the right side 1019 of the air chamber. Additionally, the right side 1019 of the air chamber 1019 is shaped to protect the blower 275 from falling recoverable materials. The blower 275 may be a squirrel cage blower or another suitable type of blower. The blower 275 may be selected to have performance characteristics that create an air stream velocity of greater than 500 feet per minute. The velocity of the stream of air 1021 created by the blower 275 will of course depend on the dimensions of the air chamber 277 and the output of the blower 275. Also, the velocity of the stream of air 1021 may be varied to separate (e.g., classify) different recoverable materials, for example, the velocity of the stream of air 1021 may be adjusted by adjusting the fan rotational speed (e.g., RPM) of the blower 275. In one example, the velocity of the stream of air 1021 is selected to separate low density recoverable materials. For example, the speed of the stream of air 1021 may range from about 400 feet per minute to about 1200 feet per minute.

Still referring to FIG. 10, recoverable materials enter the air chamber 277 after passing over the drum magnet 263 (FIG. 9) and are exposed to the stream of air 1021 created by the blower 275. Recoverable materials that are susceptible to air flow classification will be carried by the stream of air 1021 into channel 287. Channel 287 connects air chamber 277 with vestibule 265. Vestibule 265 has a larger cross sectional area, normal to the directional flow of the stream of air 1021, than air chamber 277 and channel 287. Therefore, once recoverable materials susceptible to air flow classification enter vestibule 265, the recoverable materials will fall to the bottom of the vestibule as the velocity of the stream of air 1021 decreases according to the increased area. The vestibule 265 includes a release door 271. The release door 271 may be opened periodically to empty recoverable materials from the vestibule. When the release door 271 is opened, recoverable materials fall into collection bin 273.

Still referring to FIG. 10, the vestibule 265 is also connected to duct 231. As shown in FIG. 14, optional duct 231 is connected to optional dust collector 229. Dust collector 229 creates suction in duct 231 in order to pull dust and particulate matter from the vestibule 265 to the dust collector. Once the dust and particulate matter enter the dust collector 229, the dust and particulate matter are filtered from the air and clean air is exhausted through exhaust outlet 297. An example of a suitable dust collector 229 is a Downflow® dust collector available from Donaldson Torit of Minnesota. In addition to removing dust and particulate matter from the vestibule 265, duct 231 also provides an outlet for the stream of air 1021 created by the blower 275. The dust collector 229 also can elevate the velocity of the air stream 1021 by applying a light suction through duct 231 to vestibule 265.

Turning back to FIG. 10, recoverable materials that enter the air chamber 277 and are not susceptible to air flow classification will not be carried by the stream of air 1021 into channel 287. Instead, these materials will continue to fall downward through air chamber 277. The recoverable materials will not fall into the blower 275 because the shape of the right side 1019 of the air chamber 277 is configured to divert the falling recoverable materials away from the blower 275. Materials that reach the bottom of the air chamber 277 are transported by a conveyance 279 from the air chamber 277 and can be further processed for material recovery. In the illustrated embodiment, conveyance 279 includes a conveyor belt with pulley 1001 and belt 1003. However, conveyance 279 can include any conveyance capable of moving recoverable materials from the bottom of the air chamber 277 to another area for further processing. Conveyance 279 may also be a variable speed conveyance. Air chamber 277 can include a gate 1013 which controls the flow of recoverable materials from the air chamber 277 on conveyance 279. The height and width of the gate opening may be adjusted to regulate efficiency and throughput. For example, enlarging the gate opening may increase throughput and diminishing the gate opening may decrease throughput. After passing through gate 1013, the recoverable materials move on conveyance 279 (illustrated here as moving from right to left) toward a sorting area 299.

Still referring to FIG. 10, sorting area 299 provides sorters (for example people or specialized sorting devices) access to recoverable materials that are transported on the conveyance 279. The materials transported on conveyance 279 include recoverable materials that are too large to pass through the rotating drum screen panel apertures 601 shown in FIG. 6. The materials on conveyance 279 also include recoverable materials that are not attracted to the drum magnet 263 shown in FIG. 9 and are not susceptible to separation by air classification as discussed in FIG. 10. For example, the recoverable materials transported on conveyance 279 may include non-ferrous metals. Non-ferrous metals may be recycled, reused, or sold. However, groups of non-ferrous metal recoverable materials are more valuable if it is sorted by type of metal. For example, a group of recoverable materials including brass, copper, and lead is more valuable if it is sorted into distinct groups of brass, copper, and lead because this makes further processing (recycling, reuse) more efficient. Accordingly, the sorting area 299 provides sorters access to the recoverable materials as they pass by on conveyance 279 to remove non-ferrous metals and sort them into distinct groups. The sorting area 299 may be large enough to provide access to conveyance 279 to one or more persons or sorting devices (not shown). For example, the sorting area 299 may be large enough for 3 persons to access the recoverable materials that are transported by conveyance 279.

Figure 11:
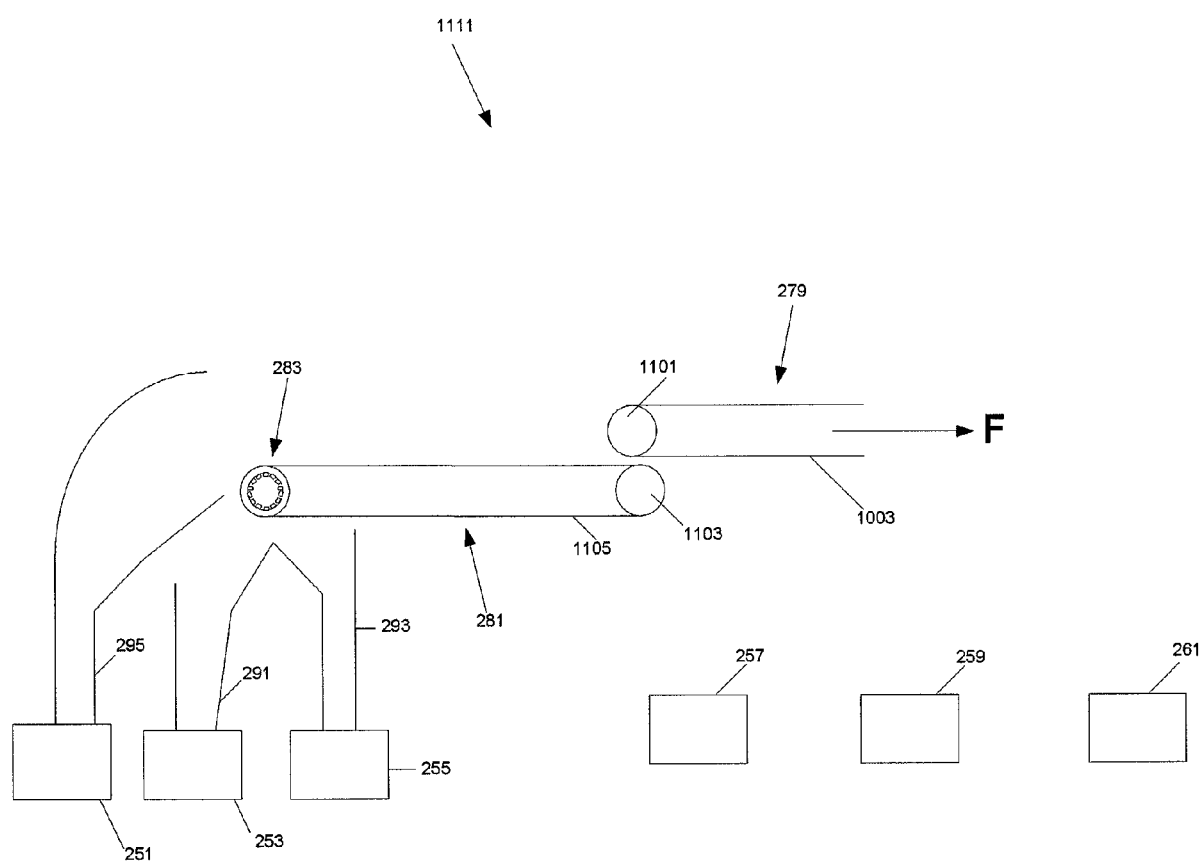
FIG. 11 is a schematic illustrating a non-ferrous metal separation system that can be used in the system depicted in FIG. 2.

Turning now to FIG. 11, a system 1111 of the system 200 (of FIG. 2) for separating non-ferrous metal recoverable materials is shown in further detail, according to one embodiment. The non-ferrous metal separation system 1111 includes the eddy current generator 283. Conveyance 279 transports recoverable materials from right to left and transfers them to another conveyance 281. As shown in FIG. 11, conveyance 279 may include a conveyor belt with belt 1003 and pulley 1101. The system 1111 may include a hood and duct (not shown) at the transfer point between conveyance 279 and 281. The inclusion of a hood and duct at this transfer point will depend on whether conveyance 279 transports soil and recoverable materials or primarily non-soil recoverable materials. As discussed above, dust collection through a hood and duct may optionally be incorporated at all transfer points where soil and other recoverable materials are transferred. In other embodiments conveyance 279 and 281 may comprise one single conveyance with no transfer point in between.

Figure 12:
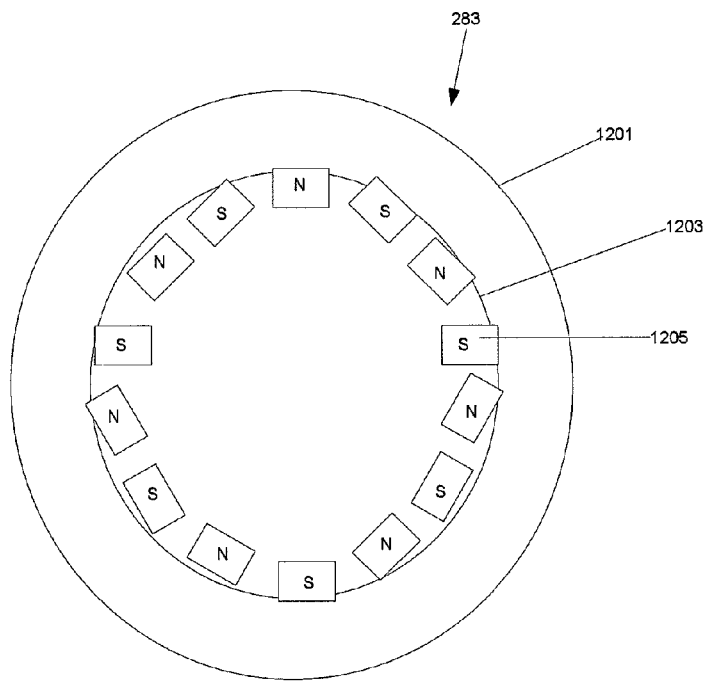
FIG. 12 is a schematic illustrating one embodiment of an end view portion of an eddy current generator.
Figure 13:
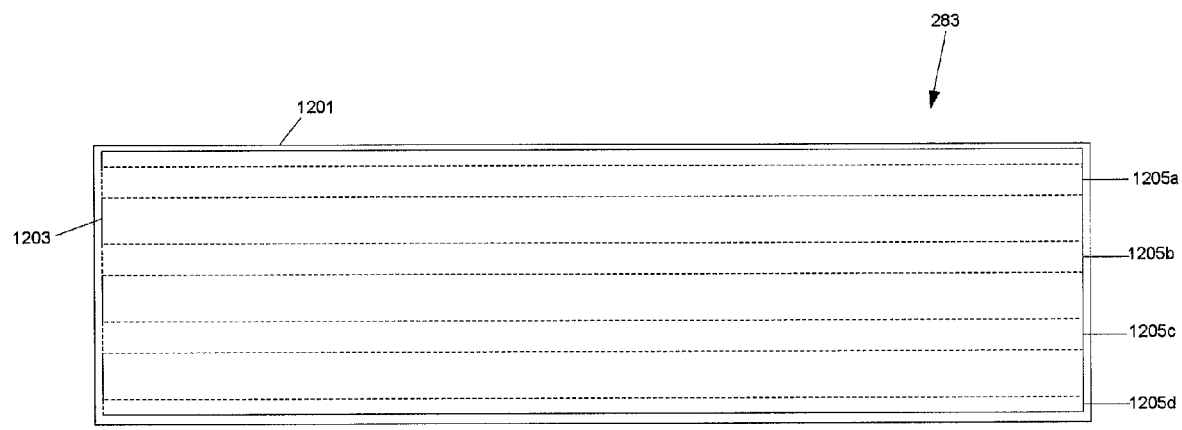
FIG. 13 is a schematic illustrating a side view of one embodiment of an eddy current generator.

Still referring to FIG. 11, once the recoverable materials pass through the sorting area 299 they are transferred from the conveyance 279 to the conveyance 281 and transported (illustrated here from left to right) towards the eddy current generator 283. The conveyance 281 can include a conveyor belt with a belt 1105 and a pulley 1103. FIG. 12 shows an enlarged end view of eddy current separator 283. As shown in FIG. 12, the eddy current generator 283 includes an inner drum 1203, a plurality of magnets 1205, and an outer shell 1201. The eddy current generator 283 may be manufactured, or purchased (for example from Walker Magnetics of Massachusetts). As shown, the magnets 1205 are placed inside the drum 1203 and disposed therewith alternating polarity (e.g., each magnet has a north pole and a south pole and the north pole of a magnet is followed by the south pole of another magnet, and so on, continuing these alternating poles). The inner drum 1203 is made of a non-ferrous material, for example, stainless steel, and the outer shell 1201 is also made of a non-ferrous material, for example, fiberglass. The outer shell 1201 rotates along with belt 1105 independently from inner drum 1203. For example, belt 1105 may move at about 2 feet per second and cause the outer shell 1201 to rotate at about 25 rpm while the inner drum 1203 rotates independently or remains still. The inner drum 1203 is configured to rotate relative to the outer shell 1201 rapidly. For example, the inner drum 1203 may spin at about 3400 rpm while the outer shell 1201 remains still or rotates independently. This rapid rotation or spinning of the inner drum 1203 and attached magnets 1205 creates a rapidly alternating magnetic field. The rapidly alternating magnetic field induces a current within conductive material that generates a magnetic field in the conductive material that opposes that of the alternating magnetic field produced by the eddy current generator 283. The opposition of the magnetic field created within the conductive material and the magnetic field created by the eddy current generator 283 produces an instantaneous repulsion in the conductor. This repulsion force may cause non-ferrous materials to jump from the eddy current generator 283 but is not strong enough to overcome the magnetic attraction between ferrous metal recoverable materials and the eddy current generator 283. Thus, the effect of the eddy currents is to repel non-ferrous metals away from the eddy current generator 283. FIG. 13 shows a side view of eddy current generator 283. As shown, magnets 1205a-1205d run the length of the inner drum 1203.

Turning back to FIG. 11, as non-ferrous metal recoverable materials approach the eddy current generator 283, eddy currents are induced within these recoverable materials. These eddy currents forcibly repel the non-ferrous metal recoverable materials away from the eddy current generator 283 and the conveyance 281, moving the metal recoverable materials such that they fall into a non-ferrous metal receptacle 295. In practice, exposing non-ferrous metal materials to the eddy current generator make these materials seemingly "jump" from the conveyance 281. The non-ferrous metal receptacle 295 directs non-ferrous metal recoverable materials into a collection bin 251. The distance between eddy current generator 283 and non-ferrous metal receptacle 295 can be adjustable. This adjustability allows the non-ferrous metal separation system 1111 to accommodate different batches of soil mixture. For example, larger pieces of non-ferrous metal may not be repelled by the eddy current generator 283 as far as smaller pieces of non-ferrous metal. Accordingly, the distance between the non-ferrous metal receptacle 295 and the eddy current generator 283 may be adjusted.

Still referring to FIG. 11, as non-ferrous non-conductive recoverable materials, for example, rocks or concrete, approach the eddy current generator 283, they are unaffected by the alternating magnetic field created. Because these recoverable materials are not conductive, the alternating magnetic field does not induce an eddy current in the recoverable materials and they are not repelled from the eddy current generator 283. Therefore, these non-ferrous non-metal recoverable materials simply drop off of conveyance 281 into a chute 291. Chute 291 then directs the non-ferrous non-metal recoverable materials into a collection bin 253. Ferrous metal recoverable materials that were not previously separated will be attracted to the magnets inside eddy current generator 283 through the belt 1105. The ferrous metal recoverable materials may remain attracted to the magnets until the belt 1105 passes away from the eddy current generator 283. Once the belt 1105 is no longer over the eddy current generator 283, the ferrous metal recoverable materials are no longer held to the belt 1105 by magnetic attraction and the recoverable materials fall into a chute 293. Chute 293 directs the ferrous metal recoverable materials into a collection bin 255.

Turning now to FIG. 14, a portion of the system 200 is shown in further detail, according to one embodiment. FIG. 14 shows an optional air pollution control system 1414. The air pollution control system 1414 includes a first dust collector 201 and a second dust collector 229. As discussed above, dust collector 201 collects dust and/or other particulate matter from transfer points in order to decrease the exposure of dust and particulate matter to persons and the ambient air. Dust collector 201 may be purchased or manufactured. For example, dust collector 201 may be a DUST-HOG® manufactured by SUPRA-BLAST. Dust collector 229 is attached to duct 231 and has an exhaust outlet 297. As discussed above, dust collector 229 pulls dust and particulate matter from the air classifier/scrubber system 1010 and filters the dust and particulate matter from the air. An example of a suitable dust collector 229 is a Downflo® dust collector available from Donaldson Torit.

Figure 15:
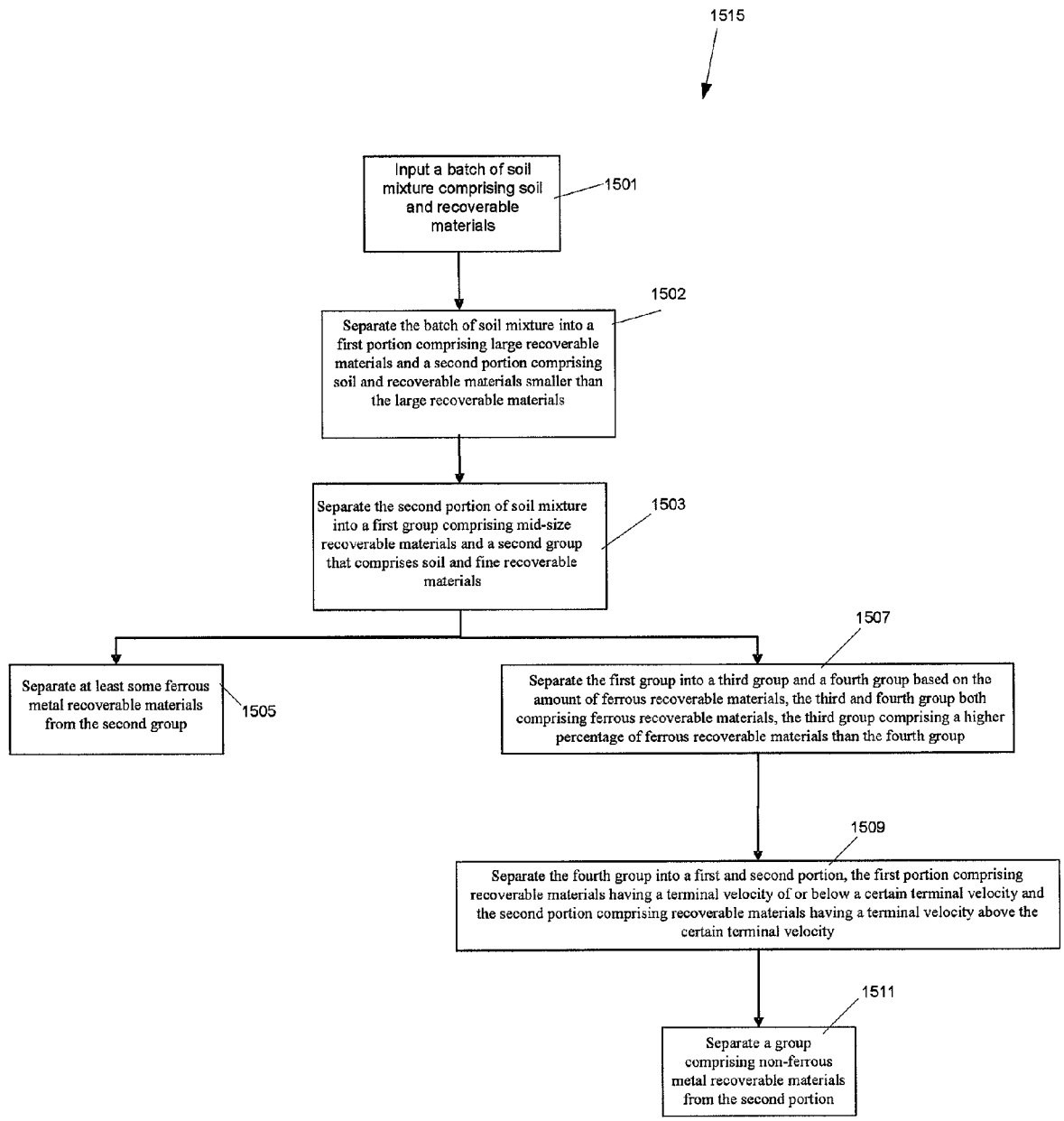
FIG. 15 is a block diagram illustrating process steps of recovering materials from soil.
Figure 16:
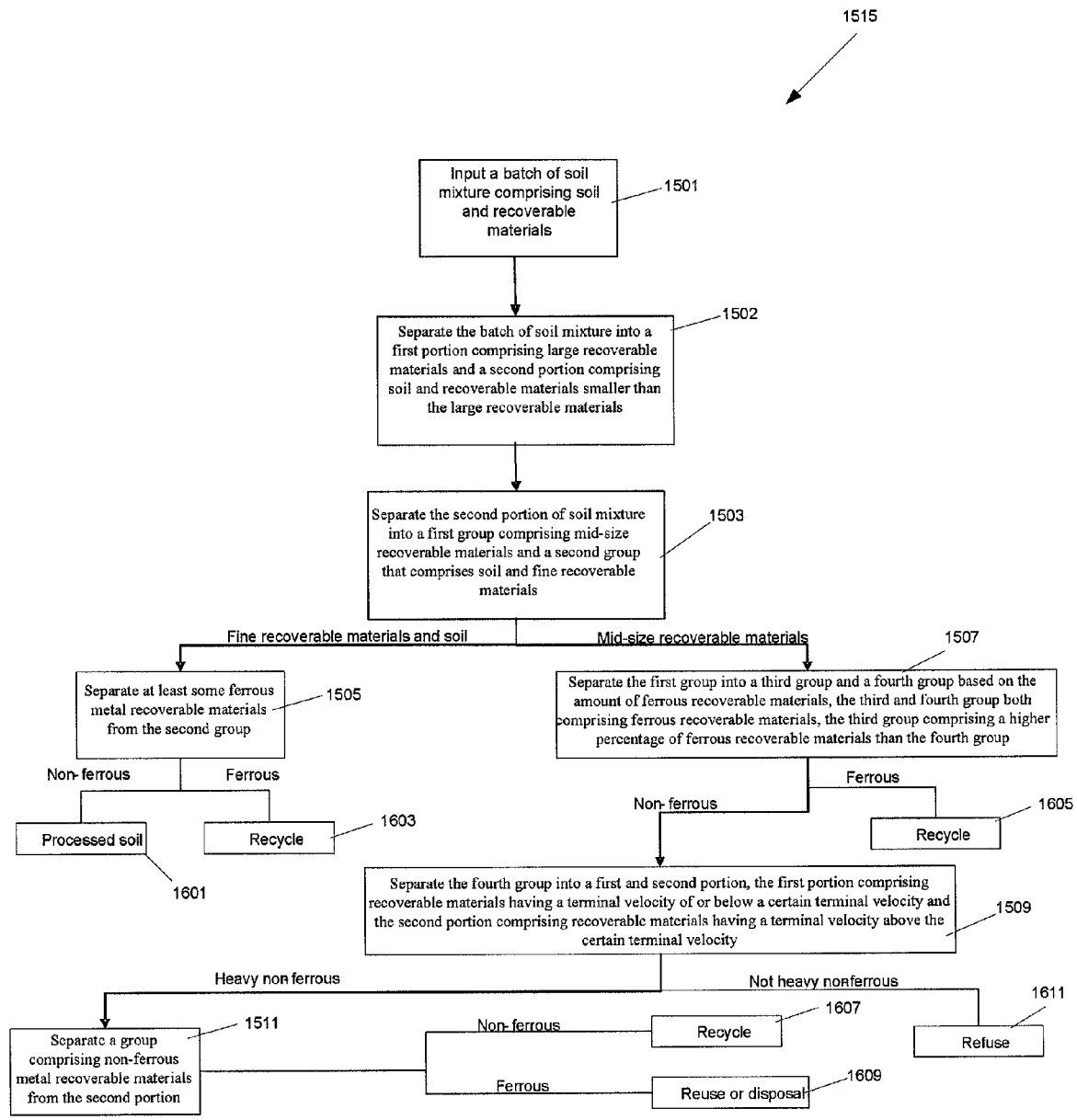
FIG. 16 is a block diagram illustrating an exemplary embodiment of a method of recovering materials from soil.

FIGS. 15 and 16 are block diagrams depicting methods of recovering materials from soil. FIG. 15 shows a method 1515 of recovering materials from a soil mixture including the steps of input a batch of soil mixture comprising soil and recoverable materials 1501, separate the batch of soil mixture into a first portion comprising soil and recoverable materials smaller than the large recoverable materials 1502, separate the second portion of soil mixture into a first group comprising mid-size recoverable materials and a second group that comprises soil and fine recoverable materials 1503, separate at least some ferrous metal recoverable materials from the second group 1505, separate the first group into a third group and a fourth group based on the amount of ferrous recoverable materials, the third and fourth group both comprising ferrous recoverable materials, the third group comprising a higher percentage of ferrous recoverable materials than the fourth group 1507, separate the fourth group into a first and second portion, the first portion comprising recoverable materials having a terminal velocity of or below a certain terminal velocity and the second portion comprising recoverable materials having a terminal velocity above the certain terminal velocity 1509, and separate a group comprising non-ferrous metal recoverable materials from the second portion 1511.

FIG. 16 shows a block diagram of method 1515 with the final outputs from the method. The step of separate at least some ferrous metal recoverable materials from the second group 1505 results in a group of processed soil 1601 and recyclable recoverable materials 1603. The step of separate the first group into a third group and a fourth group based on the amount of ferrous recoverable materials, the third and fourth group both comprising ferrous recoverable materials, the third group comprising a higher percentage of ferrous recoverable materials than the fourth group 1507 results in a group of recyclable recoverable materials 1605. The step of separate the fourth group into a first and second portion, the first portion comprising recoverable materials having a terminal velocity of or below a certain terminal velocity and the second portion comprising recoverable materials having a terminal velocity above the certain terminal velocity 1509 results in a group of refuse recoverable materials 1611. The step of separate a group comprising non-ferrous metal recoverable materials from the second portion 1511 results in a group of recyclable recoverable materials 1607 and a group of recoverable materials that may be reused or disposed 1609.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for recovering materials from soil, comprising:
   a first separator comprising a first separation element, the first separator configured to separate recoverable material bearing soil into a first portion comprising large recoverable materials that did not pass through the first separation element and a second portion of recoverable material bearing soil that did pass through the first separation element, the second portion comprising soil and recoverable materials smaller than the large recoverable materials;

a first conveyance positioned to receive the second portion from the first separator, wherein first conveyance is configured to move the second portion of recoverable material bearing soil to another separator;

a second separator having a second separation element having apertures, the second separator configured to receive the second portion of recoverable material bearing soil from the first conveyance and, using a screen structure, separate the second portion of recoverable material bearing soil into a third portion comprising mid-size recoverable materials and a fourth portion that passes through the screen structure comprising soil and recoverable materials;

a second conveyance configured to receive and move the fourth portion;

a third conveyance configured to receive and move the third portion;

a third separator comprising a magnetic device, the third separator configured to receive the fourth portion and separate the fourth portion into a first group and a second group using a magnetic field created by the magnetic device, wherein the first group contains ferrous material that was influenced by the magnetic field;

a fourth separator comprising a magnetic separation system, the fourth separator configured to receive and process the third portion using the magnetic separation system to separate the third portion into at least two groups, a mid-size non-ferrous group and a mid-size ferrous metal group, the mid-size ferrous group containing more ferrous recoverable materials than the mid-size non-ferrous group;

a fifth separator comprising an air classifier/scrubber system having air flow components and at least one material scrubber component, the fifth separator configured to receive the mid-size non-ferrous group and expose the mid-size nonferrous group to an air flow and the scrubber the at least one scrubber component and separate the mid-size non-ferrous group into a lighter weight mid-size first group and a heavier mid-size second group;

a sixth separator configured to receive the mid-size second group and separate non-ferrous metal material from the mid-size second group;

an air pollution control system comprising a plurality of intake hoods positioned to intake airborne particulate matter generated by the first, second, third, fourth, and fifth separator;

ducting connected to each of the plurality of hoods, and at least one filter configured to filter particulate matter from passing air.

2. The system of claim 1, wherein the air classifier/scrubber system comprises a scrubber surface having a plurality of protrusions, the scrubber surface disposed such that at least a portion of the mid-size non-ferrous group contacts the scrubber surface while being exposed to an air flow of the air classifier/scrubber system.

3. The system of claim 2, wherein the first conveyance comprises a conveyer belt system.

4. The system of claim 1, wherein the first separation element comprises a grizzly screen.

5. The system of claim 1, wherein the second separation element comprises a rotating drum screen.

6. The system of claim 1, wherein the sixth separator is further configured to separate ferrous metal recoverable materials from the group of recoverable materials not susceptible to air flow classification.

7. The system of claim 1, wherein the third separator comprises:

a feed hopper positioned to receive the fourth portion from the third conveyance;

an adjustable gate configured to regulate the amount of material flowing therethrough; and a variable speed conveyance configured to move the fourth portion from the feed hopper through the adjustable gate;

wherein the variable speed conveyance is configured to carry the fourth portion through the magnetic field created by the magnetic device, the magnetic device disposed such that the magnetic field created by the magnetic device holds ferrous material in the fourth portion to the variable speed conveyance, allowing the mid-size non-ferrous group to fall from the variable speed conveyance at a different point than the mid-size ferrous metal group falls from the variable speed conveyance.

8. The system of claim 1, wherein the fourth separator comprises a drum magnet.

9. The system of claim 1, wherein the sixth separator comprises an eddy current generator, and wherein the sixth separator is configured to move the mid-size second group through an electric field created by the eddy current generator causing non-ferrous metal material in the mid-size second group to move and separate from other material in the midsize second group.

10. The system of claim 1, further comprising a containment housing that contains the first size separator, the second size separator, the first conveyance, the second conveyance, the third conveyance, the third separator, the fourth separator, the fifth separator, and at least a portion of the air pollution control system.

11. The system of claim 1, wherein the first separation element comprises a plurality of parallel members disposed between about 1" and about 36" from one another.

12. The system of claim 1, wherein the apertures of the second separation element have an area between 0.10 square inches and 5 square inches.

13. The system of claim 1, wherein the air classifier/scrubber system is configured to create an air flow with a velocity between about 400 feet per minute and about 1200 feet per minute.

14. A method of recovering materials from soil, comprising the steps of:

separating a soil mixture into a first portion of large recoverable materials of a first predetermined size and a second portion of materials that are smaller than the first predetermined size;

separating the second portion into a third portion having of materials having a second predetermined size that is smaller than the first predetermined size, and a fourth portion of materials that are smaller than the second predetermined size;

separating the fourth portion into a first group and a second group using a magnetic field created by the magnetic device, wherein the first group contains ferrous material that was influenced by the magnetic field during separation;

separating the third portion into at least two groups of materials, a non-ferrous group of materials and a ferrous metal group of materials, the ferrous group of materials containing more recoverable materials containing iron than the non-ferrous group of materials;

separating non-ferrous group of materials into a lighter weight first group of materials and a heavier second group of materials by exposing the non-ferrous group of materials to a separation air flow while mechanically agitating the non-ferrous group of materials; and separating non-ferrous metal materials from the heavier second group of materials by passing the heavier second group of materials near a system that induces eddy currents in non-ferrous metal materials that are in the heavier second group of materials, the eddy currents being strong enough to physically move the non-ferrous metal materials away from a conveyance that they rest upon and into a non-ferrous metal material area.

15. The method of claim 14, wherein the separating non-ferrous group of materials into a lighter weight first group of materials and a heavier second group of materials is performed using an air classifier/scrubber system having a scrubbing structure that agitates material falling across its surface while exposing the agitated material to a separation air flow.

16. The method of claim 14, further comprising collecting airborne particulates at each of the separating steps.

\* \* \* \* \*